United States Patent [19]
Vinson et al.

[11] Patent Number: 5,851,352
[45] Date of Patent: Dec. 22, 1998

[54] SOFT MULTI-PLY TISSUE PAPER HAVING A SURFACE DEPOSITED STRENGTHENING AGENT

[75] Inventors: Kenneth Douglas Vinson, Cincinnati, Ohio; Jonathan Andrew Ficke, Lawrenceburg, Ind.; Howard Thomas Deason, Hamilton, Ohio

[73] Assignee: The Procter & Gamble Company, Cincinnati, Ohio

[21] Appl. No.: 854,397

[22] Filed: May 12, 1997

[51] Int. Cl.⁶ .................................................. D21H 23/22
[52] U.S. Cl. ........................ 162/112; 162/123; 162/124; 162/125; 162/127; 162/129; 162/130
[58] Field of Search .................................. 162/109, 111, 162/112, 113, 123, 127, 132, 133, 125, 129, 169; 156/291, 324; 428/153, 154

[56] References Cited

U.S. PATENT DOCUMENTS

| | | | |
|---|---|---|---|
| 3,301,746 | 1/1967 | Sanford et al. | 162/113 |
| 3,438,807 | 4/1969 | Pikula | 117/154 |
| 3,484,275 | 12/1969 | Iewicki | 117/93.4 |
| 3,755,071 | 8/1973 | Bey et al. | 162/184 |
| 3,814,096 | 6/1974 | Weiss et al. | 128/260 |
| 3,818,533 | 6/1974 | Scheuer | 15/104.93 |
| 3,967,030 | 6/1976 | Johnson et al. | 428/266 |
| 3,974,025 | 8/1976 | Ayers | 162/113 |
| 3,994,771 | 11/1976 | Morgan, Jr. et al. | 162/113 |
| 4,028,172 | 6/1977 | Mazzarella | 162/164 R |
| 4,112,167 | 9/1978 | Dake et al. | 428/154 |
| 4,158,594 | 6/1979 | Becker et al. | 162/112 |
| 4,191,609 | 3/1980 | Trokhan | 162/113 |
| 4,300,981 | 11/1981 | Carstens | 162/109 |
| 4,447,294 | 5/1984 | Osborn | 162/158 |
| 4,481,243 | 11/1984 | Allen | 428/154 |
| 4,513,051 | 4/1985 | Lavash | 428/212 |
| 4,613,447 | 9/1986 | Hara et al. | 252/91 |
| 4,637,859 | 1/1987 | Trokhan | 162/11 |
| 4,795,530 | 1/1989 | Soerens et al. | 162/11 |
| 4,940,513 | 7/1990 | Spendel | 162/112 |
| 4,950,545 | 8/1990 | Walter et al. | 428/446 |
| 4,959,125 | 9/1990 | Spendel | 162/158 |
| 5,059,282 | 10/1991 | Ampulski et al. | 162/111 |
| 5,164,046 | 11/1992 | Ampulski et al. | 162/111 |
| 5,215,626 | 6/1993 | Ampulski et al. | 162/112 |
| 5,217,576 | 6/1993 | Phan | 162/158 |
| 5,223,096 | 6/1993 | Phan et al. | 162/158 |
| 5,227,242 | 7/1993 | Walter et al. | 428/446 |
| 5,240,562 | 8/1993 | Phan et al. | 162/158 |
| 5,246,545 | 9/1993 | Ampulski et al. | 162/112 |
| 5,246,546 | 9/1993 | Ampulski | 162/112 |
| 5,262,007 | 11/1993 | Phan et al. | 162/158 |
| 5,264,082 | 11/1993 | Phan et al. | 162/158 |
| 5,279,767 | 1/1994 | Phan et al. | 252/357 |
| 5,312,522 | 5/1994 | Phan et al. | 162/111 |
| 5,397,435 | 3/1995 | Ostendorf et al. | 162/112 |
| 5,405,501 | 4/1995 | Phan et al. | 162/127 |
| 5,415,737 | 5/1995 | Phan et al. | 162/111 |
| 5,427,696 | 6/1995 | Phan et al. | 252/8.6 |
| 5,437,766 | 8/1995 | Phan et al. | 162/127 |
| 5,474,689 | 12/1995 | Laughlin et al. | 252/8.8 |
| 5,487,813 | 1/1996 | Vinson et al. | 162/111 |
| 5,510,000 | 4/1996 | Phan et al. | 162/111 |
| 5,538,595 | 7/1996 | Trokhan et al. | 162/123 |
| 5,543,067 | 8/1996 | Phan et al. | 106/287.25 |
| 5,573,637 | 11/1996 | Ampulski et al. | 162/112 |

FOREIGN PATENT DOCUMENTS 0144658  6/1985  European Pat. Off.  .........  D21H 1/02

*Primary Examiner*—Peter Chin
*Attorney, Agent, or Firm*—Bart S. Hersko; Edward J. Milbrada; E. Kelly Linman

[57] ABSTRACT

Strong and soft multi-ply tissue paper products useful as absorbent sanitary products such as bath tissue, facial tissue, and absorbent towels are disclosed. At least one internal surface of the tissue paper product has a surface deposited strengthening agent.

23 Claims, 6 Drawing Sheets

SOFT MULTI-PLY TISSUE PAPER HAVING A SURFACE DEPOSITED STRENGTHENING AGENT

TECHNICAL FIELD

This invention relates, in general, to tissue paper products. More specifically, it relates to tissue paper products containing surface applied strengthening agents.

BACKGROUND OF THE INVENTION

Sanitary paper tissue products are widely used. Such items are commercially offered in formats tailored for a variety of uses such as facial tissues, toilet tissues and absorbent towels.

All of these sanitary products share a need to be both strong and soft. Softness is a complex tactile impression elicited by a product when it is stroked against the skin. The purpose of being soft is so that these products can be used to cleanse the skin without being irritating.

One of the most important physical properties related to softness is generally considered by those skilled in the art to be the strength of the product. Strength is the ability of the product, and its constituent webs, to maintain physical integrity and to resist tearing, bursting, and shredding under use conditions. Achieving both a high softness and a high level of strength has long been an object of workers in the field of the present invention.

One field that has been exploited in this regard has been to select and modify cellulose fiber morphologies and engineer paper structures to take optimum advantages of the various available morphologies. Applicable art in this field includes Vinson et. al. in U.S. Pat. No. 5,228,954, issued Jul. 20, 1993, Vinson in U.S. Pat. No. 5,405,499, issued Apr. 11, 1995, and Cochrane et al. in U.S. Pat. No. 4,874,465 issued Oct. 17, 1989 all disclosing methods for selecting or upgrading fiber sources to make tissue and toweling of superior properties. Applicable art is further illustrated by Carstens in U.S. Pat. No. 4,300,981, issued 17 Nov., 1981, which discusses how fibers can be incorporated to be compliant to paper structures so that they have maximum softness potential. While such techniques as illustrated by these prior art examples are recognized broadly, they can only offer some limited potential to make tissues truly effective comfortable cleaning implements.

Another area which has received a considerable amount of attention is the addition of chemical softening agents (also referred to herein as "chemical softeners") to tissue and toweling products.

As used herein, the term "chemical softener" refers to any chemical ingredient which improves the tactile sensation perceived by the consumer who holds a particular paper product and rubs it across the skin. Although somewhat desirable for towel products, softness is a particularly important property for facial and toilet tissues. Such tactile perceivable softness can be characterized by, but is not limited to, friction, flexibility, and smoothness, as well as subjective descriptors, such as a feeling like velvet, silk or flannel. Chemical softeners, for exemplary purposes only, include basic waxes such as paraffin and beeswax and oils such as mineral oil and silicone oil as well as petrolatum and more complex lubricants and emollients such as quaternary ammonium compounds with long alkyl chains, functional silicones, fatty acids, fatty alcohols and fatty esters.

The field of work in the prior art pertaining to chemical softeners has taken two paths. The first path is characterized by the addition of softeners to the tissue paper web during its formation either by adding an attractive ingredient to the vats of pulp which will ultimately be formed into a tissue paper web, to the pulp slurry as it approaches a paper making machine, or to the wet web as it resides on a fourdrinier cloth or dryer cloth on a paper making machine.

The second path is categorized by the addition of chemical softeners to a tissue paper web after the web is dried. Applicable processes can be incorporated into the paper making operation as, for example, by spraying onto the dry web before it is wound into a roll of paper.

Exemplary art related to the former path categorized by adding chemical softeners to the tissue paper prior to its assembly into a web includes U.S. Pat. No. 5,264,082, issued to Phan and Trokhan on 23 Nov., 1993, incorporated herein by reference. Such methods have found broad use in the industry especially when it is desired to reduce the strength which would otherwise be present in the paper and when the papermaking process, particularly the creping operation, is robust enough to tolerate incorporation of the bond inhibiting agents. However, there are problems associated with these methods, well known to those skilled in the art. First, the location of the chemical softener is not controlled; it is spread as broadly through the paper structure as the fiber furnish to which it is applied. In addition, there is a loss of paper strength accompanying use of these additives. While not being bound by theory, it is widely believed that the additives tend to inhibit the formation of fiber to fiber hydrogen bonds. There also can be a loss of control of the sheet as it is creped from the Yankee dryer. Again, a widely believed theory is that the additives interfere with the coating on the Yankee dryer so that the bond between the wet web and the dryer is weakened. Prior art such as U.S. Pat. No. 5,487,813, issued to Vinson, et. al., 30 Jan., 1996, incorporated herein by reference, discloses a chemical combination to mitigate the before mentioned effects on strength and adhesion to the creping cylinder; however, there still remains a need to incorporate chemical softener while minimizing the effect on web strength and interference with the production process.

Further exemplary art related to the addition of chemical softeners to the tissue paper web during its formation includes U.S. Pat. No. 5,059,282, issued to Ampulski, et. al. on 22 Oct., 1991 incorporated herein by reference. The Ampulski patent discloses a process for adding a polysiloxane compound to a wet tissue web (preferably at a fiber consistency between about 20% and about 35%). Such a method represents an advance in some respects over the addition of chemicals into the slurry vats supplying the papermaking machine. For example, such means target the application to one of the web surfaces as opposed to distributing the additive onto all of the fibers of the furnish. However, such methods fail to overcome the primary disadvantages of the addition of chemical softeners to the wet end of the papermaking machine, namely the strength effects and the effects on the coating of the Yankee dryer, should such a dryer be employed.

Because of the before mentioned effects on strength and disruption of the papermaking process, considerable art has been devised to apply chemical softeners to already-dried paper webs either at the so-called dry end of the papermaking machine or in a separate converting operation subsequent to the papermaking step. Exemplary art from this field includes U.S. Pat. No. 5,215,626, issued to Ampulski, et. al. on 1 Jun., 1993; U.S. Pat. No. 5,246,545, issued to Ampulski, et. al. on 21 Sep., 1993; and U.S. Pat. No. 5,525,345, issued to Warner, et. al. on 11 Jun., 1996, all incorporated herein by reference. The U.S. Pat. No. 5,215, 626 discloses a method for preparing soft tissue paper by applying a polysiloxane to a dry web. The U.S. Pat. No. 5,246,545 discloses a similar method utilizing a heated transfer surface. Finally, the Warner Patent discloses methods of application including roll coating and extrusion for applying particular compositions to the surface of a dry tissue web. While each of these references represent advances over the previous so-called wet end methods particularly with regard to eliminating the degrading effects on the papermaking process, none are able to completely address the loss of tensile strength which accompanies application to the dry paper web.

Achieving a high softening potential without degrading strength has long been an object of workers in the field of the present invention. In practicing the before mentioned chemical softening techniques, it has typically been the practice to design into the structure excessively high levels of strength in order to offset the inevitable losses of strength which will occur upon the use of chemical softeners. Those skilled in the art will recognize that the use of pulp refiners or the addition of resins in the papermaking process can readily be employed for this purpose; however, they inevitably result in a loss of softness. Therefore, the underlying improvement in softness when viewed at a constant tensile strength is limited.

It has long been recognized that binders can be surface applied to tissue paper webs to impart improved properties including novel relationships between strength and softness. U.S. Pat. No. 3,862,877 issued to Camden on 28 Jan., 1975 and incorporated herein by reference is exemplary. In this reference, a tissue laminate comprising at least three layers is disclosed. While this reference discloses the use of high solids, high viscosity latex binders to impregnate a central tissue layer and further joining the central layer with each of two outer layers without migrating into either of two outer layers, the conditions of the invention yield a laminate in which the outer tissue layers are bonded to the central layer in an overall fashion yielding a multi-layered tissue paper web product rather than a multi-ply tissue paper product. Multi-ply tissue paper products are somewhat softer than similar multi-layered tissue paper products.

It has also long been the practice of using binders applied to internal surfaces of multi-ply tissue paper webs in order to form discrete bonds between the plies of multi-ply tissue paper products, effectively preventing the separation of the plies in use for example, but maintaining the structural identity as a multi-ply product. Exemplary art in this area is U.S. Pat. No. 5,143,776, issued to Givens and incorporated herein by reference. This art does not teach the use of the ply binder to significantly strengthen the multi-ply product except as regards the tendency of the plies to separate, i.e. the dry tensile strength of the product is not significantly increased.

Accordingly, it is an object of the present invention to provide a soft multi-ply tissue paper product which achieves a high level of strength.

This and other objects are obtained using the present invention as will be taught in the following disclosure.

SUMMARY OF THE INVENTION

The invention is a strong and soft multi-ply tissue paper product, wherein at least one interior surface of the tissue paper has a surface deposited strengthening agent.

The composition of the strengthening agent is preferably selected from a wide variety of polymeric materials including solvent-based adhesives, water soluble polymers, water dispersible adhesives, emulsion polymers, and hot melt adhesives. Suitable polymeric binders include starch, polyvinyl alcohol, polyamide resins, polyacrylamide resins, acrylic polymers, styrene-butadiene copolymers, vinyl acetate polymers, ethylene-vinyl acetate copolymers, vinyl chloride polymers, vinylidene chloride polymers, vinyl chloride-vinylidene copolymers, acrylo-nitrile copolymers, and ethylene-acrylic copolymers.

Elastomeric latex emulsions are preferable fluidized forms of the strengthening agent. The strengthening agents are preferably somewhat tacky, possessing glass transition temperatures of about 0 degrees C. or less, for example, but glass transition temperatures from about 50 degrees to about −50 degrees C. may be employed in the present invention. The most preferable strengthening agent is an acrylic latex with a glass transition temperature between about −30 degrees C. and about 10 degrees C.

The strengthening agent is preferably a minor component of the tissue paper product, preferably comprising only from about 0.5% to about 10% of the tissue paper product by weight based on the dry weight the strengthening agent compared to the dry weight of the tissue paper product. An even more preferable range of the composition is for the strengthening agent to comprise from about 2% to about 5% of said tissue paper product by weight.

The preferred embodiment of the present invention is a two-ply tissue paper product wherein both internal surfaces of the product contain the surface strengthening agent.

Preferably, the strengthening agent is distributed over essentially the entire internal surface of the tissue paper web upon which is resides. Most preferably, there is further provided a sparse, discrete pattern of relatively concentrated areas of the strengthening agent dispersed within a field of a relatively diffuse concentration. The function of the sparse, concentrated areas is to provide a sufficient concentration of the strengthening agent to effect an intermittent ply bond with the adjacent tissue paper web. The function of the diffuse concentration of strengthening agent is to provide strengthening of the tissue paper product without effecting a ply bond in those areas.

The invention is further a process for producing a soft, strong multi-ply tissue paper product, The steps in the process are:

a) applying by surface deposition a fluidized strengthening agent onto the surface of a tissue paper web forming a surface strengthened tissue paper web comprising from about 0.5% to about 10% of strengthening agent; and b) combining the surface strengthened tissue paper web of step (a) with at least one additional tissue paper web to form a multiply tissue paper product, orienting the surface strengthened tissue paper web such that the surface comprising the strengthening agent forms an interior surface of the multi-ply tissue paper product.

The combining step of the process of the present invention can cause a bond to form between two or more of the tissue paper webs; however, if such bonds are caused to form, they must not be formed over a majority of the surface of the webs in order to maintain a slip-plane between the tissue paper webs comprising the multi-ply tissue product of the present invention.

The fluidized strengthening agent is preferably non-uniformly deposited such that a uniform sparse, discrete pattern of relatively concentrated areas of fluidized strengthening agent is deposited within a uniformly applied, relatively diffuse pattern of fluidized strengthening agent. In this case, it is preferable to effect the combining step (b) such as to apply a combining pressure sufficient to substantially join the surface strengthened tissue paper web to the additional tissue paper web by binding via the concentrated areas of strengthening agent while employing a combining pressure insufficient to effect binding by the areas of strengthening agent residing in the uniform relatively diffuse field.

The preferred process for depositing the strengthening agent is printing.

The fluidized strengthening agent is preferably a latex emulsion. Acrylic latex is particularly suitable. More preferably, the latex emulsion has a solids content between about 10% and about 50% and most preferably between about 20% and about 30%.

The strong and soft multi-ply tissue paper product of the present invention preferably has a basis weight between about 20 g/m$^2$ and about 70 g/m$^2$ and, more preferably, between about 25 g/m$^2$ and about 50 g/m$^2$. It has a density between about 0.03 g/cm$^3$ and about 0.6 g/cm$^3$ and, more preferably, between about 0.1 g/cm$^3$ and 0.2 g/cm$^3$.

The soft tissue paper of the present invention further comprises papermaking fibers of both hardwood and softwood types wherein at least about 50% of the papermaking fibers are preferably hardwood type and at least about 10% are preferably softwood type. The hardwood and softwood fibers can be homogeneously distributed but may advantageously be isolated by relegating each to separate layers wherein one or more of the tissue paper webs comprising the multi-ply tissue paper product further comprise an inner layer and at least one outer layer. The preferred layering arrangement, in this case, is to relegate the softwood type fibers to a layer coinciding with an interior surface and the hardwood-type fibers to layer coinciding with an exterior surface.

The tissue paper webs of the present invention are preferably creped, i.e. produced on a papermaking machine culminating with a Yankee dryer to which a partially dried papermaking web is adhered and upon which it is dried and from which it is removed by the action of a flexible creping blade.

While the characteristics of the creped paper webs, particularly when the creping process is preceded by methods of pattern densification, are preferred for practicing the present invention, uncreped tissue paper is also a satisfactory substitute and the practice of the present invention using uncreped tissue paper is specifically incorporated within the scope of the present invention. Uncreped tissue paper, a term as used herein, refers to tissue paper which is non-compressively dried, most preferably by throughdrying. Resultant throughdried webs are pattern densified such that zones of relatively high density are dispersed within a high bulk field, including pattern densified tissue wherein zones of relatively high density are continuous and the high bulk field is discrete.

To produce uncreped tissue paper webs, an embryonic web is transferred from the foraminous forming carrier upon which it is laid, to a slower moving, high fiber support transfer fabric carrier. The web is then transferred to a drying fabric upon which it is dried to a final dryness. Such webs can offer some advantages in surface smoothness compared to creped paper webs.

The techniques to produce uncreped tissue in this manner are taught in the prior art. For example, Wendt, et. al. in European Patent Application 0 677 612A2, published Oct. 18, 1995 and incorporated herein by reference, teach a method of making soft tissue products without creping. In another case, Hyland, et. al. in European Patent Application 0 617 164 A1, published Sep. 28, 1994 and incorporated herein by reference, teach a method of making smooth uncreped throughdried sheets.

Tissue paper webs are generally comprised essentially of papermaking fibers. Small amounts of chemical functional agents such as wet strength or dry strength binders, retention aids, surfactants, size, chemical softeners, crepe facilitating compositions, and filler materials are frequently included but these are typically only used in minor amounts. The papermaking fibers most frequently used in tissue papers are virgin chemical wood pulps.

DETAILED DESCRIPTION OF THE INVENTION

Figure 1:
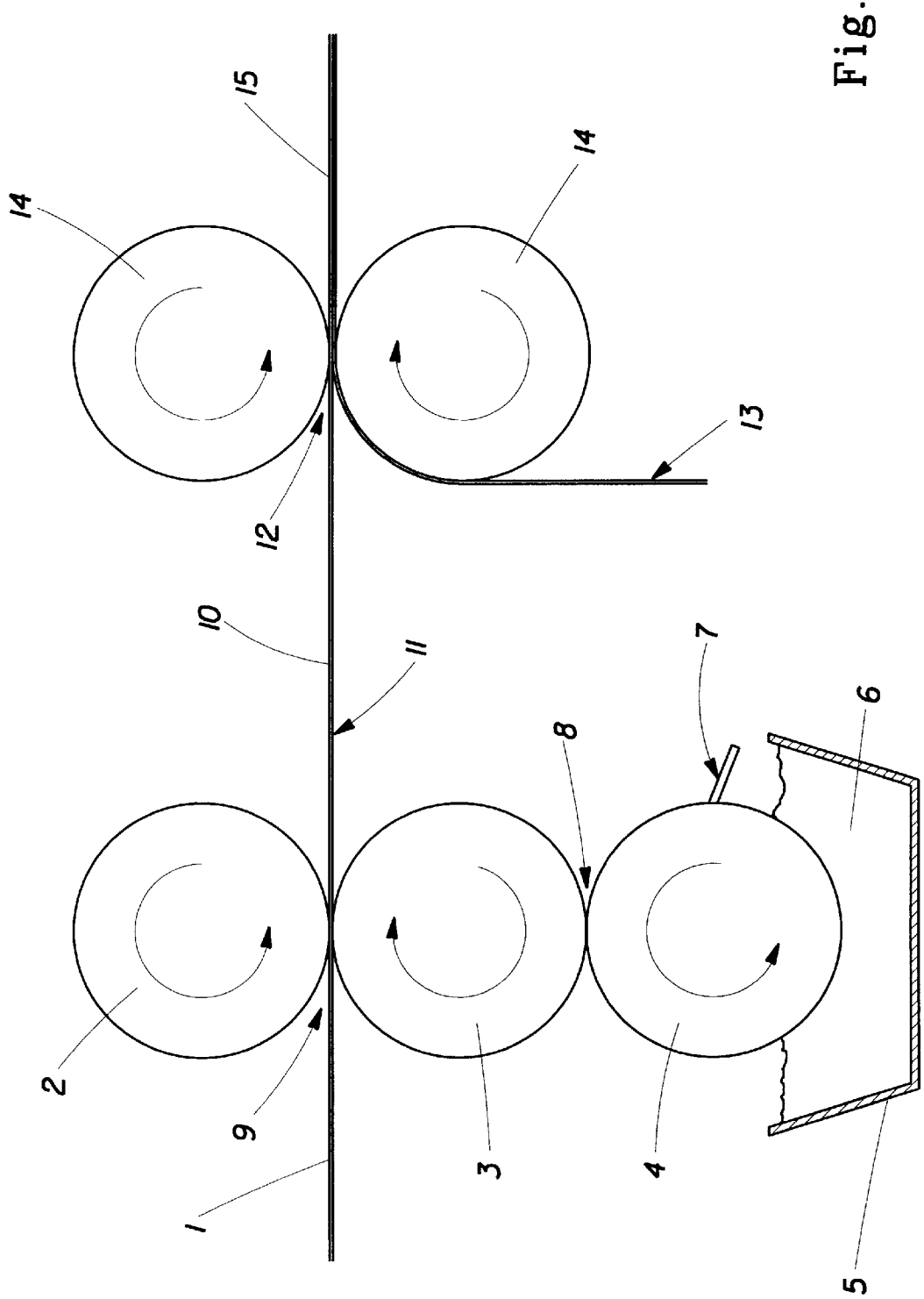
FIG. 1 is a side elevational view of a gravure printing and combining arrangement illustrating the method of forming the multi-ply tissue paper product comprising surface deposited strengthening agent of the present invention. The process depicted in FIG. 1 applies the strengthening agent to one surface of the tissue paper web by an offset gravure printing method.

While this specification concludes with claims particularly pointing out and distinctly claiming the subject matter regarded as the invention, it is believed that the invention can be better understood from a reading of the following detailed description and of the appended examples.

As used herein, the term "comprising" means that the various components, ingredients, or steps, can be conjointly employed in practicing the present invention. Accordingly, the term "comprising" encompasses the more restrictive terms "consisting essentially of" and "consisting of."

As used herein, the term "water soluble" refers to materials that are soluble in water to at least 3%, by weight, at 25° C.

As used herein, the terms "tissue paper web, paper web, and tissue web" all refer to sheets of paper made by a process comprising the steps of forming an aqueous papermaking furnish, depositing this furnish on a foraminous surface, such as a Fourdrinier wire, and removing the water from the furnish as by gravity or vacuum-assisted drainage, forming an embryonic web, transferring the embryonic web to a felt or fabric upon which it is partially or wholly dried before optionally being transferred to one or more cylindrical drum dryers before being wound upon a reel.

The terms "multi-layered tissue paper web, multi-layered paper web, multi-layered web, multi-layered tissue" are all used interchangeably in the art to refer to sheets of paper prepared from two or more layers of aqueous paper making furnish which are preferably comprised of different fiber types, the fibers typically being relatively long softwood and relatively short hardwood fibers as used in tissue paper making. The layers are preferably formed from the deposition of separate streams of dilute fiber slurries upon one or more endless foraminous surfaces. If the individual layers are initially formed on separate foraminous surfaces, the layers can be subsequently combined to form a multi-layered tissue paper web. The defining characteristic of the multi-layered tissue paper web is that the separate layers are bonded to each other over essentially their entire surface.

As used herein, the term "single-ply tissue product" means that it is comprised of one ply of tissue; the ply can be substantially homogeneous in nature or it can be a multi-layered tissue paper web.

As used herein, the term "multi-ply tissue product" means that it is comprised of more than one ply of tissue paper. The plies of a multi-ply tissue product can be substantially homogeneous in nature or they can be multi-layered tissue paper webs. The defining characteristic of the multi-ply tissue paper product is that the plies remain predominantly free of bonding to adjacent plies, i.e., if the plies of the multi-ply tissue paper product are joined, they can be joined only on a minority of their surface.

The present invention is a strong and soft multi-ply tissue paper product, wherein at least one interior surface of the tissue paper has a surface deposited strengthening agent.

As used herein the term "interior surface" refers to any surface of a multi-ply tissue paper product which remains essentially unexposed when the product is used. Interior surfaces might be partially visible from the exterior of the product, for example, by the limited opacity of the constituent tissue paper webs, but, the defining characteristic of an internal surface is that it be substantially shielded during use by the presence of the papermaking fibers constituting the tissue paper webs comprising the product.

As used herein, the term "outer surface" refers to predominantly exposed surfaces of tissue paper webs comprising multi-ply tissue paper products.

The composition of the strengthening agent is preferably selected from a wide variety of polymeric materials including solvent-based adhesives, water soluble polymers, water dispersible adhesives, emulsion polymers, and hot melt adhesives. Strengthening agents might be capable of impacting wet strength in addition to dry strength. Suitable polymeric binders include starch, polyvinyl alcohol, polyamide resins, polyacrylamide resins, acrylic polymers, styrene-butadiene copolymers, vinyl acetate polymers, ethylene-vinyl acetate copolymers, vinyl chloride polymers, vinylidene chloride polymers, vinyl chloride-vinylidene copolymers, acrylonitrile copolymers, and ethylene-acrylic copolymers.

During application the strengthening agent must be rendered fluid so that it can be deposited onto the surface of the tissue paper web. The terms "fluidized strengthening agent" or "fluidized form of the strengthening agent" are used herein to distinguish between the strengthening agent in its form at application compared to its form after application onto the surface of the tissue paper webs of the present invention. Those skilled in the art will recognize that there are a wide variety of means to accomplish fluidization. If the polymer is soluble or dispersible in water or solvent, it can be dissolved or dispersed in water or compatible solvent. If the polymer is thermoplastic, it can be subjected to sufficient rise in temperature to soften or melt the polymer to render it fluid. If it is a finely divided solid, it can be suspended in an air stream.

The most preferred form of fluidized strengthening agent is an aqueous emulsion. Water is a safe, inexpensive vehicle, and emulsions are characterized by having a relatively high solids activity without having a high viscosity.

Elastomeric synthetic latex emulsions are particularly preferable fluidized forms of the strengthening agent.

The strengthening agents are preferably somewhat tacky, possessing glass transition temperatures of 0 degrees C. or less, for example, but glass transition temperatures from 50 degrees to −50 degrees C. may be employed in the present invention. The most preferable strengthening agent is an acrylic latex with a glass transition temperature between about −30 degrees C. and about 10 degrees C.

The strengthening agent is employed at an effective amount, i.e. to produce the desired level of increase in strength which is desired. If the amount added is too small, an increase in strength will not be observed. If the amount added is too large, the application will impair the performance of the tissue paper product with respect to such properties as thickness and absorbency. Preferably, the strength agent will be a minor component of the tissue paper product, preferably comprising only from about 0.5% to about 10% of the tissue paper product by weight based on the dry weight the strengthening agent compared to the dry weight of the tissue paper product. An even more preferable range of the composition is for the strengthening agent to comprise from about 2% to about 5% of said tissue paper product by weight.

The preferred number of plies comprising the multi-ply tissue product of the present invention is two, although three or more plies may be employed as well. Two ply products possess two internal surfaces. One or, more preferably, both of the internal surfaces may possess the surface deposited strengthening agent of the present invention.

Preferably, the strengthening agent is distributed over essentially the entire internal surface of the tissue paper web upon which is resides. Most preferably, there is further provided a sparse, discrete pattern of relatively concentrated areas of the strengthening agent dispersed within a field of a relatively diffuse concentration. The function of the sparse, concentrated areas is to provide a sufficient concentration of the strengthening agent to effect an intermittent ply bond with the adjacent tissue paper web. The function of the diffuse concentration of strengthening agent is to provide strengthening of the tissue paper product without effecting a ply bond in those areas.

Tissue paper webs are characterized by having often widely disparate properties from one surface to the other. This arises from the nature of the processes from which they originate. For example, if the tissue web is made on a papermachine employing a Yankee dryer, the differences are believed to primarily be an artifact of having one of the surfaces adhesively secured to the relatively smooth Yankee surface, while the other surface, so-called herein the "felt side" surface, is pressed or deflected into a felt or a fabric. In an analogous fashion, an uncreped tissue, while not being secured to a Yankee dryer, by nature of having one of its surfaces being deflected when it is transferred from its foraminous forming carrier upon which it is laid to a slower moving high fiber support transfer fabric carrier, will have one relatively textured surface, also referred to herein as a "felt side" surface. In either case, the surface opposite the felt side surface is referred to herein as the "wire side" surface.

There is a preferred orientation of the tissue paper webs comprising the multi-ply tissue paper product of the present invention. The preferred orientation of the webs is such that exterior surfaces coincide with wire side surfaces while interior surfaces coincide with felt-side surfaces. Without being bound by theory, inventors believe that the greater smoothness of the wire side surfaces is advantageously utilized as an exterior surface while the greater texture of the felt side surface offers improved ease of depositing the strengthening agent as taught herein.

The invention is further a process for producing a soft, strong multiply tissue paper product. The steps in the process are:

a) applying by surface deposition a fluidized strengthening agent onto the surface of a tissue paper web forming a surface strengthened tissue paper web comprising from about 0.5% to about 10% of strengthening agent; and b) combining the surface strengthened tissue paper web of step (a) with at least one additional tissue paper web to form a multiply tissue paper product, orienting the surface strengthened tissue paper web such that the surface comprising the strengthening agent forms an interior surface of the multi-ply tissue paper product.

The fluidized strengthening agent is preferably non-uniformly deposited such that a uniform sparse, discrete pattern of relatively concentrated areas of fluidized strengthening agent is deposited within a uniformly applied, relatively diffuse pattern of fluidized strengthening agent. In this case, it is preferable to effect the combining step (b) such as to apply a combining pressure sufficient to substantially join the surface strengthened tissue paper web to the additional tissue paper web by binding via the concentrated areas of strengthening agent while employing a combining pressure insufficient to effect binding by the areas of strengthening agent residing in the uniform relatively diffuse field.

The preferred process for depositing the strengthening agent is printing. The most preferable printing method is direct gravure.

The fluidized strengthening agent is preferably an aqueous latex emulsion. Acrylic latex is particularly suitable. More preferably, the latex emulsion has a solids content between about 10% and about 50% and most preferably between about 20% and about 30%.

The preferred embodiment of the present invention is characterized by having the surface deposited strengthening agent covering essentially the entire interior surface upon which it resides. A frequency of uniform deposits of fluidized strengthening agent at about 100 deposits per inch or more is sufficient to accomplish this. Most preferably, a frequency of between about 200 and about 1000 deposits per inch is desired.

The term "frequency" in reference to the spacing of the deposits of chemical softener, as used herein, is defined as the number of deposits per lineal inch as measured in the direction of closest spacing. It is recognized that many patterns or arrangements of deposits qualify as being uniform and discrete and the spacing can be measured in several directions. For example, a rectilinear arrangement of deposits would be measured as having fewer deposits per inch in a diagonal line than on the horizontal and the vertical. Inventors believe that the direction of minimal spacing is the most significant and therefore define the frequency in that direction. A common engraving pattern is the so-called "hexagonal" pattern in which the recessed areas are engraved on centers residing on the corners of a equilateral hexagon with an additional recessed area in the center of the hexagonal figure. It is recognized that the closest spacing for this arrangement lies along a pair of lines intersecting each other at 60° and each intersecting a horizontal line at 60°. The number of cells per square area in a hexagonal arrangement is thus 1.15 times the square of the frequency.

The uniform surface deposits of fluidized strengthening agent are preferably less than about 250 microns in diameter, more preferably less than about 150 microns in diameter, and most preferably less than about 50 microns in diameter. The size of the deposits stated above refer to the size of fluidized strengthening agent at the instant of contact with the tissue paper web. It should be recognized that preferred fluidized strengthening agents have a viscosity and surface tension which promote wicking once applied to the substrate. The area covered by strengthening agent is thus believed to be higher than predicted by the deposit frequency and deposit size ranges specified herein before. In fact, substantially the entire surface will be covered by strengthening agent in the preferred embodiment of the present invention.

The present invention is further characterized by having the uniform surface deposits predominantly residing on at least one and more preferably both, of the two interior surfaces of a two-ply multi-ply tissue paper product.

The tissue paper webs of the present invention can be bonded to each other either by means of the strengthening agent or by other means; if such bonds are present, they must not be formed over a majority of the surface of the webs in order to maintain a slip-plane between the tissue paper webs comprising the multi-ply tissue product of the present invention.

One particularly effective means to accomplish this is to deposit the fluidized strengthening agent non-uniformly. Particularly preferred non-uniform application is characterized by having the agent deposited such that a uniform sparse pattern of relatively concentrated areas of fluidized strengthening agent is deposited within a uniformly applied, relatively diffuse pattern of fluidized strengthening agent and wherein the combining step of the process of the present invention is effected by applying a combining pressure sufficient to substantially join a surface strengthened tissue paper web to an additional tissue paper web by binding via the concentrated areas of strengthening agent. The combining pressure is selected to be insufficient to effect binding by the areas of strengthening agent residing in the uniform relatively diffuse field.

The relatively diffuse pattern of fluidized strengthening agent is characterized by covering essentially the entire interior surface upon which it resides. As stated herein before, a spacing of uniform deposits of fluidized strengthening agent at about 100 deposits per inch or more is sufficient to accomplish this. Most preferably, a spacing of between about 200 and about 1000 deposits per inch is desired. Also, as stated herein before, the uniform surface deposits of fluidized strengthening agent are preferably less than about 250 microns in diameter, more preferably less than about 150 microns in diameter, and most preferably less than about 50 microns in diameter, wherein the specified diameters refer to the size of the deposits of fluidized strengthening agent at the instant of contact with the tissue paper web.

By contrast, the relatively uniform sparse pattern of relatively concentrated areas of fluidized strengthening agent is characterized by covering only a minor fraction of the interior surface upon which it resides. A frequency of uniform deposits of fluidized strengthening agent comprising the sparse pattern at less than about 2 deposits per inch is sufficient to accomplish this. Most preferably, a frequency of between about 0.2 and about 1 deposit per inch is desired. The uniform surface deposits of fluidized strengthening agent in the sparse pattern are preferably more than about 1000 microns in diameter, more preferably more than about 2500 microns in diameter, and most preferably more than about 5000 microns in diameter. The size of the deposits stated above refer to the size of fluidized strengthening agent at the instant of contact with the tissue paper web. It should be recognized that preferred fluidized strengthening agents have a viscosity and surface tension which promote wicking once applied to the substrate. The area covered by strengthening agent is thus believed to be higher than predicted by the deposit frequency and deposit size ranges specified herein before. However, the frequency and deposit size of the deposits residing in the sparse pattern should be selected to minimize "growing" of the deposit size, since the function of these deposits is strictly to promote an intermittent ply bond to the adjacent tissue paper web rather than securing the plies together in an overall fashion.

The multi-ply tissue paper product of the present invention preferably has a basis weight between about 20 g/m² and about 70 g/m² and, more preferably, between about 25 glm² and about 50 g/m². It has a density between about 0.03 g/cm³ and about 0.6 g/cm³ and, more preferably, between about 0.1 g/cm³ and 0.2 g/cm³.

The soft tissue paper of the present invention further comprises papermaking fibers of both hardwood and softwood types wherein at least about 50% of the papermaking fibers are hardwood and at least about 10% are softwood. The hardwood and softwood fibers are most preferably isolated by relegating each to separate layers wherein the tissue paper webs comprising the multi-ply tissue paper product possess an inner layer and at least one outer layer.

The tissue paper webs of the present invention are preferably creped, i.e., produced on a papermaking machine culminating with a Yankee dryer to which a partially dried papermaking web is adhered and upon which it is dried and from which it is removed by the action of a flexible creping blade.

Creping is a means of mechanically compacting paper in the machine direction. The result is an increase in basis weight (mass per unit area) as well as dramatic changes in many physical properties, particularly when measured in the machine direction. Creping is generally accomplished with a flexible blade, a so-called doctor blade, against a Yankee dryer in an on machine operation.

A Yankee dryer is a large diameter, generally 8–20 foot drum which is designed to be pressurized with steam to provide a hot surface for completing the drying of papermaking webs at the end of the papermaking process. The paper web which is first formed on a foraminous forming carrier, such as a Fourdrinier wire, where it is freed of the copious water needed to disperse the fibrous slurry is generally transferred to a felt or fabric in a so-called press section where de-watering is continued either by mechanically compacting the paper or by some other de-watering method such as through-drying with hot air, before finally being transferred in the semi-dry condition to the surface of the Yankee for the drying to be completed.

Most preferable variations of the creped papermaking process for making tissue papers useful in the present invention include the so-called pattern densified methods in which the resultant structure is characterized by having a relatively high bulk field of relatively low fiber density and an array of densified zones of relatively high fiber density dispersed within the high bulk field. The high bulk field is alternatively characterized as a field of pillow regions. The densified zones are alternatively referred to as knuckle regions. The densified zones may be discretely spaced within the high bulk field or may be interconnected, either fully or partially, within the high bulk field. Preferably, the zones of relatively high density are continuous and the high bulk field is discrete. Preferred processes for making pattern densified tissue webs are disclosed in U.S. Pat. No. 3,301,746, issued to Sanford and Sisson on Jan. 31, 1967, U.S. Pat. No. 3,974,025, issued to Peter G. Ayers on Aug. 10, 1976, and U.S. Pat. No. 4,191,609, issued to Paul D. Trokhan on Mar. 4, 1980, and U.S. Pat. No. 4,637,859, issued to Paul D. Trokhan on Jan. 20, 1987, U.S. Pat. No. 4,942,077 issued to Wendt et al. on Jul. 17, 1990 all of which are incorporated herein by reference.

To form pattern densified creped tissue webs, the web transfer step immediately after forming the web is to a forming fabric rather than a felt. The web is juxtaposed against an array of supports comprising the forming fabric. The web is pressed against the array of supports, thereby resulting in densified zones in the web at the locations geographically corresponding to the points of contact between the array of supports and the wet web. The remainder of the web not compressed during this operation is referred to as the high bulk field. This high bulk field can be further dedensified by application of fluid pressure, such as with a vacuum type device or a blow-through dryer. The web is dewatered, and optionally predried, in such a manner so as to substantially avoid compression of the high bulk field. This is preferably accomplished by fluid pressure, such as with a vacuum type device or blow-through dryer, or alternately by mechanically pressing the web against an array of supports wherein the high bulk field is not compressed. The operations of dewatering, optional predrying and formation of the densified zones may be integrated or partially integrated to reduce the total number of processing steps performed. The moisture content of the semi-dry web at the point of transfer to the Yankee surface is less than about 40% and the hot air is forced through said semi-dry web while the semi-dry web is on said forming fabric to form a low density structure.

The pattern densified web is transferred to the Yankee dryer and dried to completion, preferably still avoiding mechanical pressing. In the present invention, preferably from about 8% to about 55% of the creped tissue paper surface comprises densified knuckles having a relative density of at least 125% of the density of the high bulk field.

The array of supports is preferably an imprinting carrier fabric having a patterned displacement of knuckles which operate as the array of supports which facilitate the formation of the densified zones upon application of pressure. The pattern of knuckles constitutes the array of supports previously referred to. Imprinting carrier fabrics are disclosed in U.S. Pat. No. 3,301,746, Sanford and Sisson, issued Jan. 31, 1967, U.S. Pat. No. 3,821,068, Salvucci, Jr. et al., issued May 21, 1974, U.S. Pat. No. 3,974,025, Ayers, issued Aug. 10, 1976, U.S. Pat. No. 3,573,164, Friedberg et al., issued March 30, 1971, U.S. Pat. No. 3,473,576, Amneus, issued Oct. 21, 1969, U.S. Pat. No. 4,239,065, Trokhan, issued Dec. 16, 1980, and U.S. Pat. No. 4,528,239, Trokhan, issued Jul. 9, 1985, all of which are incorporated herein by reference.

Most preferably, the embryonic web is caused to conform to the surface of an open mesh drying/imprinting fabric by the application of a fluid force to the web and thereafter thermally predried on said fabric as part of a low density paper making process. When the thermal pre-drying is carried out by passing hot air through the embryonic web, the process is referred to in the art as through-air dried. Through-air dried webs in particular are preferred for use in the present invention.

The advantages of the present invention will be realized to the greatest degree when the drying or imprinting fabric herein before described is one which is characterized by having continuous high density ("knuckle") areas dispersed within a high bulk field. Preferably, relatively high bulk areas of a differential density structure are discrete regions referred to as "pillows" herein. When the drying or imprinting fabric comprises continuous high density or knuckle areas, the pillows are necessarily discrete. The frequency of pillows in a given area of the tissue paper is significant. It is desirable to maintain as high a level of pillows as possible for maximum bulk and visibility of the imprinting fabric pattern. However, excessive size can detract significantly from softness owing to the negatives of the more grossly textured surface.

Another variation of the processing steps included within the present invention includes the formation of, so-called uncompacted, non pattern-densified multi-layered tissue paper structures such as are described in U.S. Pat. No. 3,812,000 issued to Joseph L. Salvucci, Jr. and Peter N. Yiannos on May 21, 1974 and U.S. Pat. No. 4,208,459, issued to Henry E. Becker, Albert L. McConnell, and Richard Schutte on Jun. 17, 1980, both of which are incorporated herein by reference. In general uncompacted, non pattern densified multi-layered tissue paper structures are prepared by depositing a paper making furnish on a foraminous forming wire such as a Fourdrinier wire to form a wet web, draining the web and removing additional water without mechanical compression until the web has a fiber consistency of at least 80%, and creping the web. Water is removed from the web by vacuum dewatering and thermal drying. The resulting structure is a soft but weak high bulk sheet of relatively uncompacted fibers. Bonding material is preferably applied to portions of the web prior to creping.

While the characteristics of the creped paper webs, particularly when the creping process is preceded by methods of pattern densification, are preferred for practicing the present invention, uncreped tissue paper is also a satisfactory substitute and the practice of the present invention using uncreped tissue paper is specifically incorporated within the scope of the present invention.

Uncreped tissue paper, a term as used herein, refers to tissue paper which is non-compressively dried, most preferably by throughdrying. Resultant throughdried webs are pattern densified such that zones of relatively high density are dispersed within a high bulk field, including pattern densified tissue wherein zones of relatively high density are continuous and the high bulk field is discrete.

To produce uncreped tissue paper webs, an embryonic web is transferred from the foraminous forming carrier upon which it is laid, to a slower moving, high fiber support transfer fabric carrier. The web is then transferred to a drying fabric upon which it is dried to a final dryness. Such webs can offer some advantages in surface smoothness compared to creped paper webs.

The techniques to produce uncreped tissue in this manner are taught in the prior art. For example, Wendt, et. al. in European Patent Application 0 677 612A2, published Oct. 18, 1995 and incorporated herein by reference, teach a method of making soft tissue products without creping. In another case, Hyland, et. al. in European Patant Application 0 617 164 A1, published Sep. 28, 1994 and incorporated herein by reference, teach a method of making smooth uncreped throughdried sheets.

FIGS. 1–7 are presented as an aid in understanding the present invention.

FIG. 1 is a side elevational view of a gravure printing and combining arrangement illustrating the method of forming the multi-ply tissue paper product comprising surface deposited strengthening agent of the present invention. The process depicted in FIG. 1 applies the strengthening agent to one surface of the tissue paper web by an offset gravure printing method.

Referring to FIG. 1, fluidized strengthening agent 6 is shown in a pan 5, such that rotating gravure roller 4 is partially immersed in the fluidized strengthening agent 6. The gravure roller 4 has a plurality of recessed areas which are substantially void of contents when they enter pan 5, but fill with fluidized strengthening agent 6 as the gravure roller 4 becomes partially immersed in the fluidized strengthening agent in pan 5 during roller rotation.

Still referring to FIG. 1, excess fluidized strengthening agent 6 that is picked up from pan 5 but is not held in the recessed areas is removed by flexible doctor blade 7, which contacts gravure roller 4 on its outer surface, but is unable to significantly deform into the recessed areas. Hence, the remaining fluidized strengthening agent on gravure roller 4 resides almost exclusively in the recessed areas of the gravure roller 4. This remaining fluidized strengthening agent is transferred in the form of deposits to applicator roller 3. Applicator roller 3 can have any of a variety of surface coverings provided they suit the purpose of the process. Most commonly, applicator roller 3 in this printing arrangement will be covered with a compressible covering such as an elastomeric polymer such as a natural or synthetic rubber. Gravure roller 4 and applicator roller 3 normally will operate with interference since having a loading pressure will aid in the extraction of the fluidized strengthening agent from the recessed areas of gravure roller 4 as they successively pass through area 8 formed by interference of gravure roller 4 and applicator roller 3. Interference or actual contact between the roller surfaces in area 8 is usually preferred, but it is envisioned that certain combinations of size and shape of recessed areas and strengthening agent fluidized characteristics might permit satisfactory transfer by merely having the two rollers pass within close proximity. The fluidized strengthening agent extracted in area 8 from gravure roller 4 to applicator roller 3 takes the form of surface deposits corresponding in size and spacing to the pattern of recessed areas of gravure roller 4. The deposits of fluidized strengthening agent on applicator roller 3 transfer to tissue paper web 1, which is directed towards area 9, an area defined by the point at which applicator roller 3, tissue paper web 1, and impression roller 2 are in the vicinity of one another. Impression roller 2 can have any of a variety of surface coverings provided they suit the purpose of the process. Most commonly, impression roller 2 in this configuration will have a metallic covering. Impression roller 2 and applicator roller 3 normally will operate without interfering. It is only necessary to have the rollers pass sufficiently close to one another such that when tissue paper web 1 is present in area 9, tissue paper web 1 contacts with the deposits of fluidized strengthening agent on applicator roller 3 sufficiently to cause them to at least partially be transferred from applicator roller 3 to tissue paper web 1. Since loading pressure between applicator roller 3 and impression roller 2 will tend to compress tissue web 1, excessively small gaps between the two rollers should be avoided in order to preserve the thickness or bulk of the tissue web 1. An interference or actual contact between the roller surfaces (through tissue paper web 1) in area 9 is usually not necessary, but it is envisioned that certain combinations of patterns and strengthening agent fluidized characteristics might require that the two rollers be operated in contact with one another. Tissue paper web 1 exits area 9 with side 11 containing surface deposits of strengthening agent. Tissue paper web 10 is tissue paper web 1 that exited area 9 with side 11 containing surface deposits of strengthening agent.

Still referring to FIG. 1, tissue paper web 10 and tissue paper web 13 are directed towards and combined in area 12, an area defined by the point at which the two combiner rollers 14, tissue paper web 10, and tissue paper web 13 are in the vicinity of one another. Combiner rollers 14 can have any of a variety of surface coverings provided they suit the purpose of the process. Most commonly, one of the combiner rollers 14 will be covered with a compressible covering such as an elastomeric polymer such as a natural or synthetic rubber, while the other combiner roller will have a metallic covering. A fixed gap, that is less than the sum of the thickness of tissue paper web 10 and tissue paper web 13, between the combiner rollers 14 in area 12 is preferred, such that ply bond is achieved as multi-ply tissue paper product 15 exits area 12. But it is envisioned that certain combinations of tissue paper web characteristic and combiner roller surface characteristic might permit satisfactory plybond and satisfactory multi-ply tissue paper product 15 thickness with an interference between the combiner rollers 14.

Figure 2:
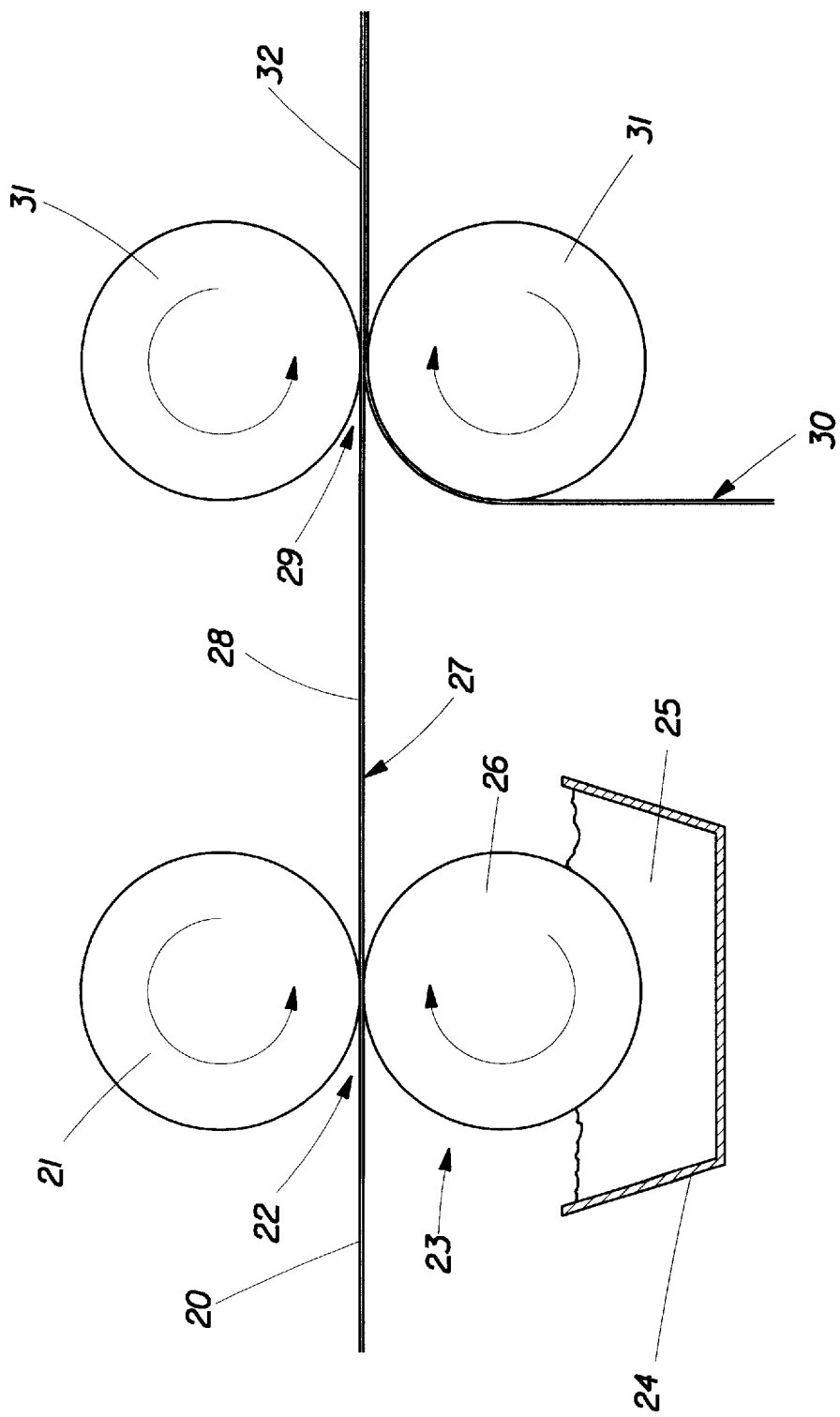
FIG. 2 is a side elevational view of a gravure printing and combining arrangement illustrating the method of forming the multi-ply tissue paper product comprising surface deposited strengthening agent of the present invention. The process depicted in FIG. 2 applies the strengthening agent to one surface of the tissue paper web by a direct gravure printing method.

FIG. 2 is a side elevational view of a gravure printing and combining arrangement illustrating the method of forming the multi-ply tissue paper product comprising surface deposited strengthening agent of the present invention. The process depicted in FIG. 2 applies the strengthening agent to one surface of the tissue paper web by a direct gravure printing method.

Referring to FIG. 2, fluidized strengthening agent 25 is shown in a pan 24, such that rotating gravure roller 26 is partially immersed in the fluidized strengthening agent 25. The gravure roller 26 has a plurality of recessed areas which are substantially void of contents when they enter pan 24, but fill with fluidized strengthening agent 25 as the gravure roller 26 becomes partially immersed in the fluidized strengthening agent in pan 24 during roller rotation.

Still referring to FIG. 2, excess fluidized strengthening agent 25 that is picked up from pan 24 but is not held in the recessed areas is removed by flexible doctor blade 23, which contacts gravure roller 26 on its outer surface, but is unable to significantly deform into the recessed areas. Hence, the remaining fluidized strengthening agent on gravure roller 26 resides almost exclusively in the recessed areas of the gravure roller 26. This remaining fluidized strengthening agent is transferred in the form of deposits to tissue paper web 20, which is directed towards area 22. The transfer occurs because the tissue paper web 20 is brought into the vicinity of the fluidized strengthening agent present in the recessed areas due to the constraint of the impression roller 21 relative to gravure roller 26 in area 22. Impression roller 21 can have any of a variety of surface coverings provided they suit the purpose of the process. Most commonly, the impression roller 21 will be covered with a compressible covering such as an elastomeric polymer such as a natural or synthetic rubber. The gravure roller 26 and the impression roller 21 will normally operate with interference, i.e. be in contact through tissue paper web 20, since having a loading pressure will aid in extraction of the fluidized strengthening agent from the recessed areas of gravure roller 26 as they successively pass through area 22 formed by the interference of gravure roller 26, the tissue paper web 20, and impression roller 26. An interference or actual contact between the roller surfaces transmitted through tissue paper web 20 in area 22 is usually preferred, but it is envisioned that certain fluidized characteristics might permit satisfactory transfer by merely having the two rollers and confined tissue paper web pass within close proximity. The tissue paper web 20 exits area 22 with side 27 containing surface deposits of strengthening agent. Tissue paper web 28 is tissue paper web 20 that exited area 22 with side 27 containing surface deposits of strengthening agent.

Still referring to FIG. 2, tissue paper web 28 and tissue paper web 30 are directed towards and combined in area 29, an area defined by the point at which the two combiner rollers 31, tissue paper web 28, and tissue paper web 30 are in the vicinity of one another. Combiner rollers 31 can have any of a variety of surface coverings provided they suit the purpose of the process. Most commonly, one of the combiner rollers 31 will be covered with a compressible covering such as an elastomeric polymer such as a natural or synthetic rubber, while the other combiner roller will have a metallic covering. A fixed gap, that is less than the sum of the thickness of tissue paper web 28 and tissue paper web 30, between the combiner rollers 31 in area 29 is preferred, such that ply bond is achieved as multi-ply tissue paper product 32 exits area 29. But it is envisioned that certain combinations of tissue paper web characteristic and combiner roller surface characteristic might permit satisfactory plybond and satisfactory multi-ply tissue paper product 32 thickness with an interference between the combiner rollers 31.

Figure 3:
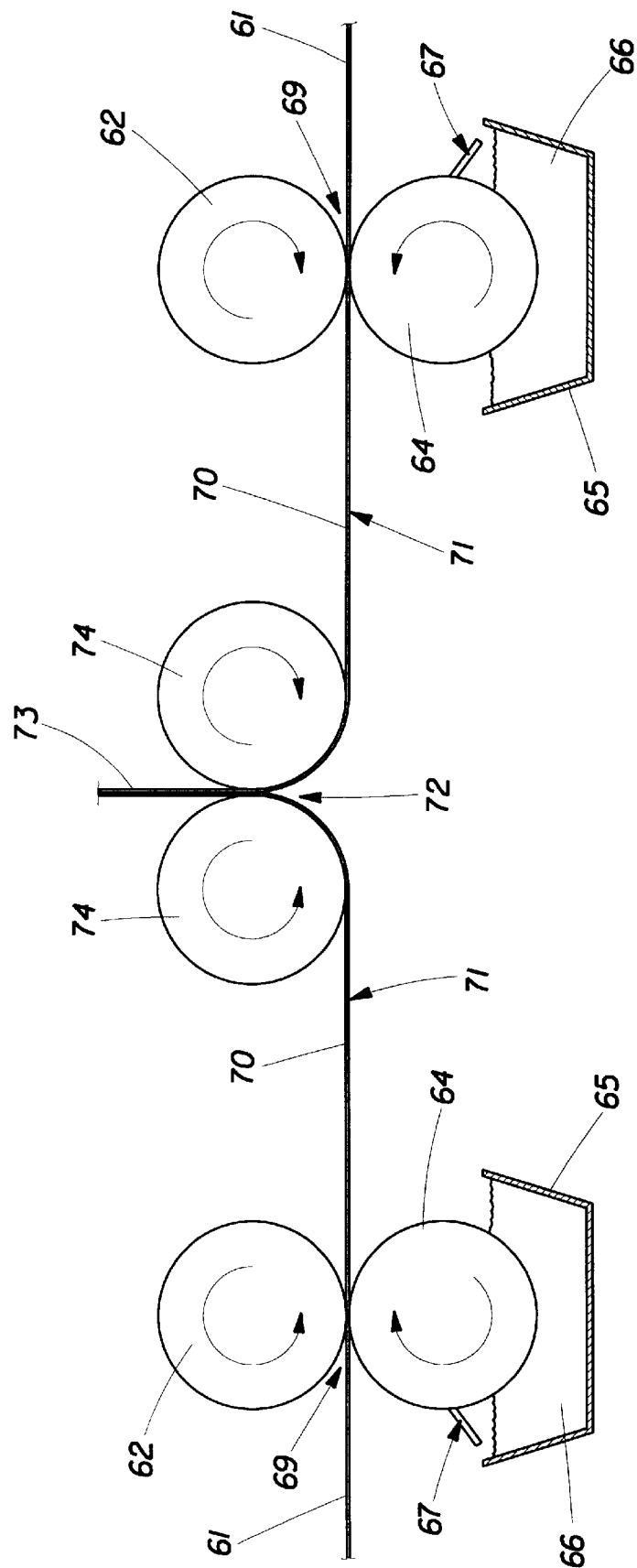
FIG. 3 is a side elevational view of a gravure printing and combining arrangement illustrating the method of forming the multi-ply tissue paper product comprising surface deposited strengthening agent of the present invention. The process depicted in FIG. 3 applies the strengthening agent to one surface of two tissue paper webs by a direct gravure printing method, which are then combined to form a multi-ply tissue paper product.

FIG. 3 is a side elevational view of a gravure printing and combining arrangement illustrating the method of forming the multi-ply tissue paper product comprising surface deposited strengthening agent of the present invention. The process depicted in FIG. 3 applies the strengthening agent to one surface of two tissue paper webs by a direct gravure printing method, which are then combined to form a multi-ply tissue paper product.

Referring to FIG. 3, fluidized strengthening agent 66 is shown in a pans 65, such that rotating gravure rollers 64 are partially immersed in the fluidized strengthening agent 66. The gravure rollers 64 have a plurality of recessed areas which are substantially void of contents when they enter pans 65, but fill with fluidized strengthening agent 66 as the gravure rollers 64 becomes partially immersed in the fluidized strengthening agent in pans 65 during roller rotation.

Still referring to FIG. 3, excess fluidized strengthening agent 66 that is picked up from pans 65 but is not held in the recessed areas is removed by flexible doctor blades 67, which contact gravure rollers 64 on the outer surface, but is unable to significantly deform into the recessed areas. Hence, the remaining fluidized strengthening agent on gravure rollers 64 resides almost exclusively in the recessed areas of the gravure rollers 64. This remaining fluidized strengthening agent is transferred in the form of deposits to tissue paper webs 61, which is directed towards areas 69.

The transfer occurs because the tissue paper webs 61 is brought into the vicinity of the fluidized strengthening agent present in the recessed areas due to the constraint of the impression rollers 62 relative to gravure rollers 67 in areas 69. Impression rollers 62 can have any of a variety of surface coverings provided they suit the purpose of the process. Most commonly, the impression rollers 62 will be covered with a compressible covering such as an elastomeric polymer such as a natural or synthetic rubber. The gravure rollers 67 and the impression rollers 62 will normally operate with interference, i.e. be in contact through tissue paper webs 61, since having a loading pressure will aid in extraction of the fluidized strengthening agent from the recessed areas of gravure rollers 67 as they successively pass through areas 69 formed by the interference of gravure rollers 67, the tissue paper webs 61, and impression rollers 62. An interference or actual contact between the roller surfaces transmitted through tissue paper webs 61 in areas 69 is usually preferred, but it is envisioned that certain fluidized characteristics might permit satisfactory transfer by merely having the impression rollers 62, gravure rollers 64, and confined tissue paper webs pass within close proximity. The tissue paper webs 61 exit areas 69 with side 71 containing surface deposits of strengthening agent. Tissue paper webs 70 is tissue paper webs 61 that exited areas 69 with sides 71 containing surface deposits of strengthening agent.

Still referring to FIG. 3, tissue paper webs 70 are directed towards and combined in area 72, an area defined by the point at which the two combiner rollers 74 and tissue paper webs 70 are in the vicinity of one another. Combiner rollers 74 can have any of a variety of surface coverings provided they suit the purpose of the process. Most commonly, one of the combiner rollers 74 will be covered with a compressible covering such as an elastomeric polymer such as a natural or synthetic rubber, while the other combiner roller will have a metallic covering. A fixed gap, that is less than the sum of the thickness of tissue paper webs 70, between the combiner rollers 74 in area 72 is preferred, such that ply bond is achieved as multi-ply tissue paper product 73 exits area 72. But it is envisioned that certain combinations of tissue paper web characteristic and combiner roller surface characteristic might permit satisfactory plybond and satisfactory multi-ply tissue paper product 72 thickness with an interference between the combiner rollers 74.

Figure 4:
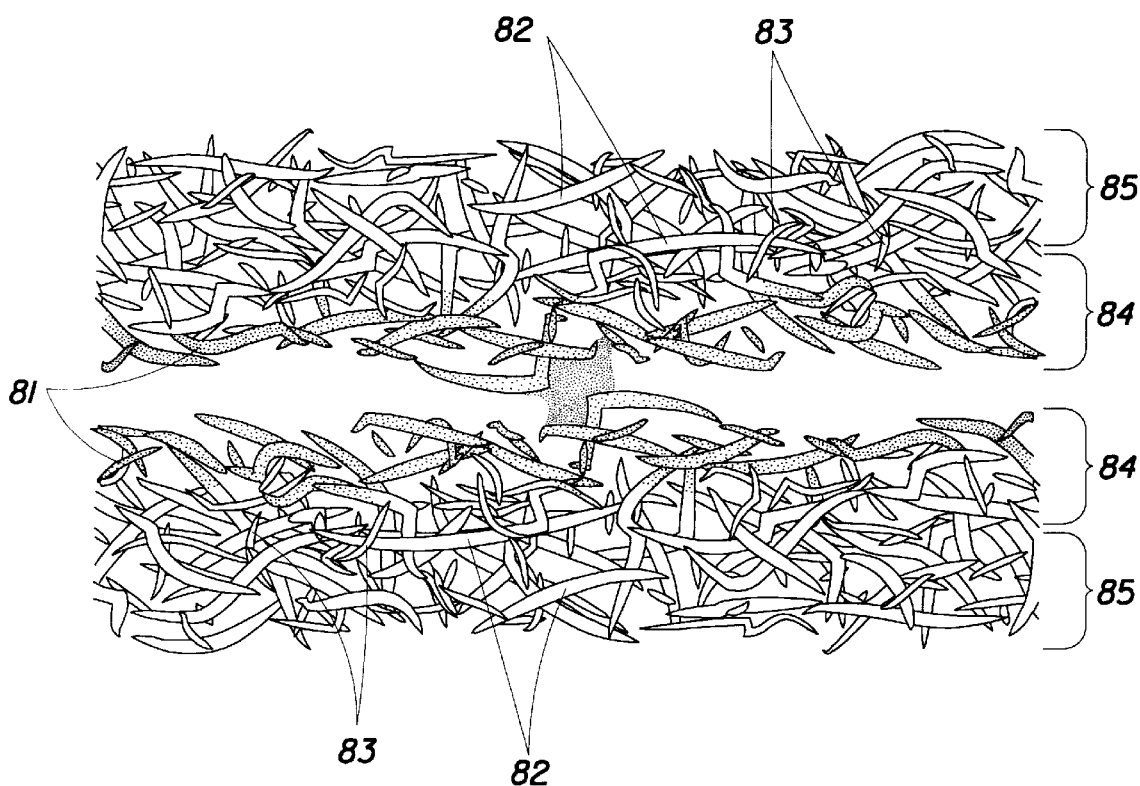
FIG. 4 is a cross sectional schematic representation of the multiply tissue paper product of the present invention illustrating the zones in which the strengthening agent is present.

FIG. 4 is a cross sectional schematic representation of the multiply tissue paper product of the present invention illustrating the zones in which the surface deposited strengthening agent is present.

Referring to FIG. 4, the multi-ply tissue comprises long fibers 82 and short fibers 83. The preferred long fibers 82 are Northern Softwood Kraft. The preferred short fibers 83 are Eucalyptus. The interior tissue paper web zone 84 comprises long fibers 82, short fibers 83, and a strengthening agent 81. The preferred side of the interior tissue paper web zone 84 is the felt side. The exterior tissue paper web zone 85 comprises long fibers 82, short fibers 83, but is substantially free of strengthening agent. The preferred side of the external tissue paper web 85 is the wire side. The plies of the multi-ply tissue paper product are bonded together by the strengthening agent in concentrated discrete array 86, while being substantially unbonded outside of these areas.

Figure 5:
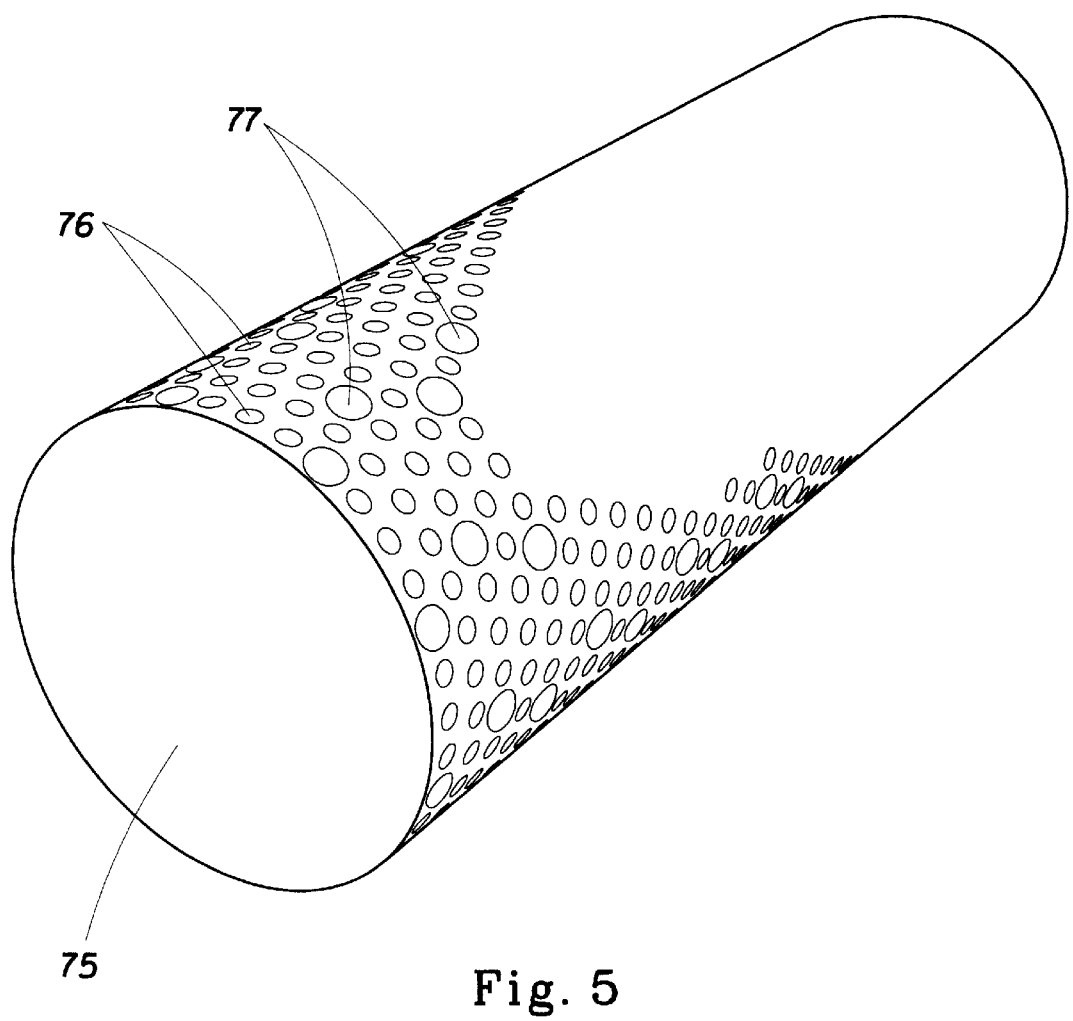
FIG. 5 is a schematic representation illustrating the detail of the recessed areas for use on the printing rollers illustrated in FIGS. 1, 2, and 3, i.e. gravure roller 4 of FIG. 1, gravure roller 26 of FIG. 2, gravure roller 64 of FIG. 3.

FIG. 5 is a schematic representation illustrating the detail of the recessed areas for use on the printing rollers illustrated in FIGS. 1, 2, and 3, i.e. gravure roller 4 of FIG. 1, gravure roller 26 of FIG. 2, gravure roller 64 of FIG. 3.

Referring to FIG. 5, the gravure roller 75 possesses a plurality of recessed areas sometimes referred to as cells. The recessed areas 76 and 77 exist on an otherwise smooth roller surface.

Still referring to FIG. 5, the roller 75 may be comprised of a variety of materials. In general, it will be relatively non-compressible in nature such as a metallic or ceramic roll, but elastomeric roll coverings are possible as well.

Still referring to FIG. 5, Most preferably, the surface of the roller 75 is ceramic such as aluminum oxide. This permits the creation of the plurality of recessed areas by engraving them by directing an intense laser beam at the surface as is well known in the process printing industry.

Still referring to FIG. 5, An alternate means of creating the recessed areas on roller 75 is to electromechanical engrave them using an electronically controlled oscillation of a diamond tipped cutting tool. When this method is selected, it is most convenient to surface the roll with copper until it is engraved and then to plate a thin chrome finish to protect the soft copper layer.

Still referring to FIG. 5, an alternate means of creating the recessed areas on roller 75 is to chemically etch them using a labile roll surface protected by a chemically resistant mask secured on the rolls surface to prevent etching in the areas not intended to become recessed areas 76 and 77. When this method is selected, it is again most convenient to surface the roll with copper until it is etched and then to plate a thin chrome finish to protect the soft copper layer.

Still referring to FIG. 5, an alternate means of creating the recessed areas on roller 75 is to mechanically engrave them using a knurled cutting tool. This method permits the widest variety of materials of construction for the roller but suffers from little possible variation in the achievable patterns.

Still referring to FIG. 5, the smaller but more frequent recessed areas 76 are useful in applying the strengthening agent of the present invention in a relatively diffuse pattern. The larger but less frequent recessed areas 77 are useful to apply the strengthening agent of the present invention in a sparse discrete pattern to promote adhesion of the tissue paper web to an adjacent tissue paper web.

Figure 6:
FIG. 6 is a scanning electron micrograph of the felt side of a paper tissue web comprising long fibers, short fibers, and surface applied strengthening agent.

FIG. 6 is a scanning electron micrograph of the felt side of a paper tissue web comprising long fibers, short fibers, and surface applied strengthening agent. The strengthening agent appears as a coating on the fibers, encapsulating the fibers. The fibers in FIG. 6 comprise the felt side of the paper tissue web. The felt side of the paper tissue web in FIG. 6 was surface applied with a strengthening agent.

Figure 7:
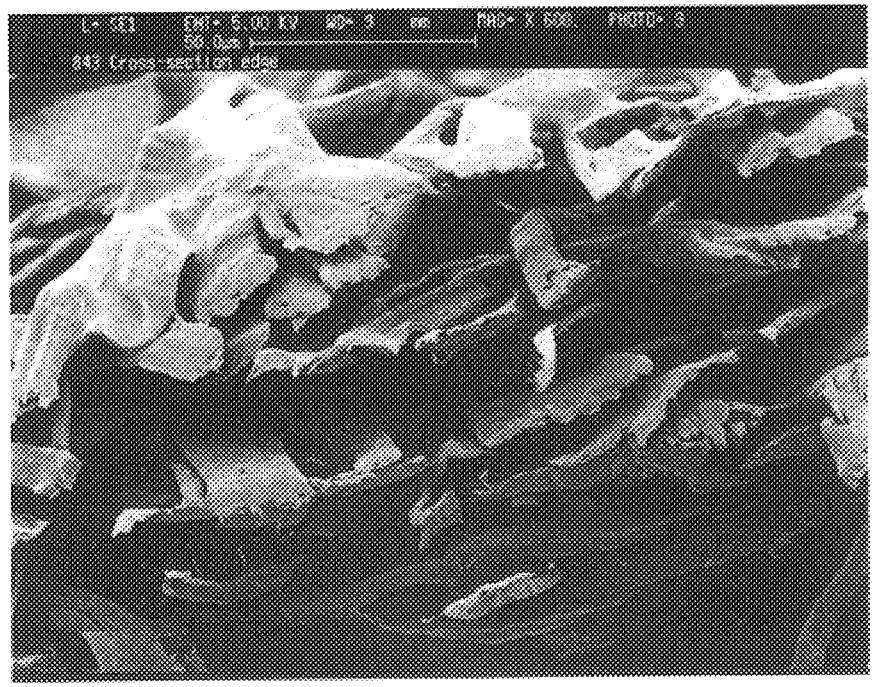
FIG. 7 is a scanning electron micrograph of the cross section of a paper tissue web comprising long fibers, short fibers, and surface applied strengthening agent.

FIG. 7 is a scanning electron micrograph of the cross section of a paper tissue web comprising long fibers, short fibers, and surface applied strengthening agent. The strengthening agent appears as a coating on the fibers at the top of FIG. 7, welding the fibers together. The fibers at the top of FIG. 7 comprise the felt side of the paper tissue web. The felt side of the paper tissue web in FIG. 7 was surface applied with a strengthening agent. The strengthening agent remains substantively absent from the fibers at the bottom of FIG. 7. The fibers at the bottom of FIG. 7 comprise the wire side of the paper tissue web. The wire side of the paper tissue web in FIG. 7 was not surface applied with a strengthening agent.

It is anticipated that wood pulp in all its varieties will normally comprise the tissue papers with utility in this invention. However, other cellulose fibrous pulps, such as cotton inters, bagasse, rayon, etc., can be used and none are disclaimed. Wood pulps useful herein include chemical pulps such as, sulfite and sulfate (sometimes called Kraft) pulps as well as mechanical pulps including for example, ground wood, ThermoMechanical Pulp (TMP) and Chemi-ThermoMechanical Pulp (CTMP). Pulps derived from both deciduous and coniferous trees can be used.

Both hardwood pulps and softwood pulps as well as combinations of the two may be employed as papermaking fibers for the tissue paper of the present invention. The term "hardwood pulps" as used herein refers to fibrous pulp derived from the woody substance of deciduous trees (angiosperms), whereas "softwood pulps" are fibrous pulps derived from the woody substance of coniferous trees (gymnosperms). Blends of hardwood Kraft pulps, especially eucalyptus, and northern softwood Kraft (NSK) pulps are particularly suitable for making the tissue webs of the present invention. A preferred embodiment of the present invention comprises the use of layered tissue webs wherein, most preferably, hardwood pulps such as eucalyptus are used for layer(s) which will comprise outer surfaces of the multi-ply tissue paper product and wherein northern softwood Kraft pulps are used for the layer(s) which will comprise interior surfaces of the multi-ply tissue paper product. Also applicable to the present invention are fibers derived from recycled paper, which may contain any or all of the above categories of fibers.

Optional Chemical Additives

Other materials can be added to the aqueous papermaking furnish or the embryonic web to impart other characteristics to the product or improve the papermaking process so long as they are compatible with the chemistry of the strengthening agent and do not significantly and adversely affect the softness or strength character of the present invention. The following materials are expressly included, but their inclusion is not offered to be all-inclusive. Other materials can be included as well so long as they do not interfere or counteract the advantages of the present invention.

It is common to add a cationic charge biasing species to the papermaking process to control the zeta potential of the aqueous papermaking furnish as it is delivered to the papermaking process. These materials are used because most of the solids in nature have negative surface charges, including the surfaces of cellulosic fibers and fines and most inorganic fillers. One traditionally used cationic charge biasing species is alum. More recently in the art, charge biasing is done by use of relatively low molecular weight cationic synthetic polymers preferably having a molecular weight of no more than about 500,000 and more preferably no more than about 200,000, or even about 100,000. The charge densities of such low molecular weight cationic synthetic polymers are relatively high. These charge densities range from about 4 to about 8 equivalents of cationic nitrogen per kilogram of polymer. One example material is Cypro 514®, a product of Cytec, Inc. of Stamford, Conn. The use of such materials is expressly allowed within the practice of the present invention.

The use of high surface area, high anionic charge microparticles for the purposes of improving formation, drainage, strength, and retention is taught in the art. See, for example, U.S. Pat. No. 5,221,435, issued to Smith on Jun. 22, 1993, incorporated herein by reference. Common materials for this purpose are silica colloid, or bentonite clay. The incorporation of such materials is expressly included within the scope of the present invention.

While the essence of the present invention is the presence of a strengthening agent composition deposited preferably in the form of discrete, closely spaced deposits on the interior surface of the multi-ply tissue paper product, the invention also expressly includes variations in which chemical strengthening agents are added as a part of the papermaking process.

For example, if permanent wet strength is desired, the group of chemicals: including polyamide-epichlorohydrin, polyacrylamides, styrene-butadiene latices; insolubilized polyvinyl alcohol; urea-formaldehyde; polyethyleneimine; chitosan polymers and mixtures thereof can be added to the papermaking furnish or to the embryonic web. Polyamide-epichlorohydrin resins are cationic wet strength resins which have been found to be of particular utility. Suitable types of such resins are described in U.S. Pat. No. 3,700,623, issued on Oct. 24, 1972, and U.S. Pat. No. 3,772,076, issued on Nov. 13, 1973, both issued to Keim and both being hereby incorporated by reference. One commercial source of useful polyamide-epichlorohydrin resins is Hercules, Inc. of Wilmington, Del., which markets such resin under the mark Kymene 557H®.

Many paper products must have limited strength when wet because of the need to dispose of them through toilets into septic or sewer systems. If wet strength is imparted to these products, it is preferred to be fugitive wet strength characterized by a decay of part or all of its potency upon standing in presence of water. If fugitive wet strength is desired, the binder materials can be chosen from the group consisting of dialdehyde starch or other resins with aldehyde functionality such as Co-Bond 1000® offered by National Starch and Chemical Company, Parez 750® offered by Cytec of Stamford, Conn. and the resin described in U.S. Pat. No. 4,981,557 issued on Jan. 1, 1991, to Bjorkquist and incorporated herein by reference.

If enhanced absorbency is needed, surfactants may be used to treat the tissue paper webs of the present invention. The level of surfactant, if used, is preferably from about 0.01% to about 2.0% by weight, based on the dry fiber weight of the tissue paper. The surfactants preferably have alkyl chains with eight or more carbon atoms. Exemplary anionic surfactants are linear alkyl sulfonates, and alkylbenzene sulfonates. Exemplary nonionic surfactants are alkylglycosides including alkylglycoside esters such as Crodesta SL-40® which is available from Croda, Inc. (New York. N.Y.); alkylglycoside ethers as described in U.S. Pat. No. 4.011,389, issued to W. K. Langdon, et al. on Mar. 8, 1977; and alkylpolyethoxylated esters such as Pegosperse 200 ML available from Glyco Chemicals, Inc. (Greenwich, Conn.) and IGEPAL RC-520® available from Rhone Poulenc Corporation (Cranbury, N.J.).

Chemical softening agents may also be included either by wet end addition, to the embryonic web or via methods of addition to the tissue paper web after it has been dried. Preferred chemical softening agents comprise quaternary ammonium compounds including, but not limited to, the well-known dialkyldimethylammonium salts (e.g. ditallowdimethylammonium chloride, ditallowdimethylammonium methyl sulfate, di(hydrogenated tallow)dimethyl ammonium chloride, etc.). Particularly preferred variants of these softening agents are what are considered to be mono or diester variations of the before mentioned dialkyldimethylammonium salts. These include so-called diester ditallow dimethyl ammonium chloride, diester distearyl dimethyl ammonium chloride, monoester ditallow dimethyl ammonium chloride, diester di(hydrogenated)tallow dimethyl ammonium methyl sulfate, diester di(hydrogenated)tallow dimethyl ammonium chloride, monoester di(hydrogenated) tallow dimethyl ammonium chloride, and mixtures thereof, with the diester variations of di(non hydrogenated)tallow dimethyl ammonium chloride, Di(Touch Hydrogenated) Tallow DiMethyl Ammonium Chloride (DEDTHTDMAC) and Di(Hydrogenated)Tallow DiMethyl Ammonium Chloride (DEDHTDMAC), and mixtures thereof being especially preferred. Depending upon the product characteristic requirements, the saturation level of the ditallow can be tailored from non hydrogenated (soft) to touch, partially or completely hydrogenated (hard).

The use of quaternary ammonium ingredients as described herein before is most effectively accomplished if they are accompanied by an appropriate plasticizer. The plasticizer can be added during the quaternizing step in the manufacture of the quaternary ammonium ingredient or it can be added subsequently. The plasticizer is characterized by being substantially inert during the chemical synthesis, but acts as a viscosity reducer to aid in the synthesis and subsequent handling, i.e. application of the quaternary ammonium compound to the tissue paper product. Preferred pasticizers are comprised of a combination of a non-volatile polyhydroxy compound and a fatty acid. Preferred polyhydroxy compounds include glycerol and polyethylene glycols having a molecular weight of from about 200 to about 2000, with polyethylene glycol having a molecular weight of from about 200 to about 600 being particularly preferred. Preferred fatty acids comprise C6–C23 linear or branched and saturated or unsaturated analogs with isostearic acid being the most preferred.

Another class of preferred chemical softening agents comprise the well-known organo-reactive polydimethyl siloxane ingredients, including the most preferred amino functional polydimethyl siloxane.

A particularly preferred form of the silicone softening agent is to combine the organo-reactive silicone with a suitable quaternary ammonium compound. In this embodiment the organo-functional silicone is preferred to be an amino polydimethyl siloxane and is used at an amount ranging from 0 up to about 50%, with a preferred usage being in the range of about 5% to about 15%. The previous percentages represent the weight of the polysiloxane relative to the total weight of the substantively affixed softening agent.

Filler materials may also be incorporated into the tissue papers of the present invention. U.S. Pat. No. 5,611,890, Vinson et al., issue Mar. 18, 1997, and, incorporated herein by reference discloses filled tissue paper products acceptable as substrates for the present invention.

The above listings of optional chemical additives is intended to be merely exemplary in nature, and are not meant to limit the scope of the invention.

The present invention is further applicable to the use of multi-layered tissue paper webs. Multilayered tissue structures and methods of forming multilayered tissue structures are described in U.S. Pat. No. 3,994,771, Morgan, Jr. et al. issued Nov. 30, 1976, U.S. Pat. No. 4,300,981, Carstens, issued Nov. 17, 1981, U.S. Pat. No. 4,166,001, Dunning et al., issued Aug. 28, 1979, and European Patant Publication No. 0 613 979A1, Edwards et al., published Sep. 7, 1994, all of which are incorporated herein by reference. The layers are preferably comprised of different fiber types, the fibers typically being relatively long softwood and relatively short hardwood fibers as used in multi-layered tissue paper making. Multi-layered tissue paper webs most preferred for use in the present invention comprise at least two superposed layers, an inner layer and at least one outer layer contiguous with the inner layer. Preferably, the multi-layered tissue paper web comprise two superposed layers, an inner layer and an outer layer. The outer layer preferably comprises a primary filamentary constituent of relatively short paper making fibers having an average fiber length between about 0.5 and about 1.5 mm, preferably less than about 1.0 mm. These short paper making fibers typically comprise hardwood fibers, preferably hardwood Kraft fibers, and most preferably derived from eucalyptus. The inner layer preferably comprises a primary filamentary constituent of relatively long paper making fibers having an average fiber length of least about 2.0 mm. These long paper making fibers are typically softwood fibers, preferably, northern softwood Kraft fibers.

Single-layered or multi-layered tissue paper webs can be used to make the multi-ply tissue paper products of the present invention.

In typical practice of the present invention, a low consistency pulp furnish is provided in a pressurized headbox. The headbox has an opening for delivering a thin deposit of pulp furnish onto the Fourdrinier wire to form a wet web. The web is then typically dewatered to a fiber consistency of between about 7% and about 25% (total web weight basis) by vacuum dewatering.

To prepare tissue paper products with utility in the present invention, an aqueous papermaking furnish is deposited on a foraminous surface to form an embryonic web. The scope of the invention also includes processes for making tissue paper product by the formation of multiple paper layers in which two or more layers of furnish are preferably formed from the deposition of separate streams of dilute fiber slurries for example in a multi-channeled headbox. The layers are preferably comprised of different fiber types, the fibers typically being relatively long softwood and relatively short hardwood fibers as used in multi-layered tissue paper making. If the individual layers are initially formed on separate wires, the layers are subsequently combined when wet to form a multi-layered tissue paper web. The papermaking fibers are preferably comprised of different fiber types, the fibers typically being relatively long softwood and relatively short hardwood fibers. More preferably, the hardwood fibers comprise at least about 50% and said softwood fibers comprise at least about 10% of said papermaking fibers.

The term "strength" as used herein refers to the specific total tensile strength, the determination method for this measure is included in a later section of this specification. The tissue paper webs according to the present invention are strong. This generally means that their total tensile strength is at least about 200 g/in, more preferably more than about 400 g/in.

The multi-ply tissue paper products of to the present invention can be used in any application where soft, absorbent multi-ply tissue paper products are employed. Particularly advantageous uses of the multi-ply tissue paper products of this invention are in toilet tissue and facial tissue products.

Analytical and Testing Procedures

A. Density

The density of multi-layered tissue paper, as that term is used herein, is the average density calculated as the basis weight of that paper divided by the caliper, with the appropriate unit conversions incorporated therein. Caliper of the multi-layered tissue paper, as used herein, is the thickness of the paper when subjected to a compressive load of 95 g/in$^2$ (15.5 g/cm$^2$).

B. Measurement of Panel Softness of Tissue Papers

Ideally, prior to softness testing, the paper samples to be tested should be conditioned according to Tappi Method #T4020M-88. Here, samples are preconditioned for 24 hours at a relative humidity level of 10 to 35% and within a temperature range of 22° to 40° C. After this preconditioning step, samples should be conditioned for 24 hours at a relative humidity of 48 to 52% and within a temperature range of 22° to 24° C.

Ideally, the softness panel testing should take place within the confines of a constant temperature and humidity room. If this is not feasible, all samples, including the controls, should experience identical environmental exposure conditions.

Softness testing is performed as a paired comparison in a form similar to that described in "Manual on Sensory Testing Methods", ASTM Special Technical Publication 434, published by the American Society For Testing and Materials 1968 and is incorporated herein by reference. Softness is evaluated by subjective testing using what is referred to as a Paired Difference Test. The method employs a standard external to the test material itself. For tactile perceived softness two samples are presented such that the subject cannot see the samples, and the subject is required to choose one of them on the basis of tactile softness. The result of the test is reported in what is referred to as Panel Score Unit (PSU). With respect to softness testing to obtain the softness data reported herein in PSU, a number of softness panel tests are performed. In each test ten practiced softness judges are asked to rate the relative softness of three sets of paired samples. The pairs of samples are judged one pair at a time by each judge: one sample of each pair being designated X and the other Y. Briefly, each X sample is graded against its paired Y sample as follows:

1. a grade of plus one is given if X is judged to may be a little softer than Y, and a grade of minus one is given if Y is judged to may be a little softer than X;
2. a grade of plus two is given if X is judged to surely be a little softer than Y, and a grade of minus two is given if Y is judged to surely be a little softer than X;
3. a grade of plus three is given to X if it is judged to be a lot softer than Y, and a grade of minus three is given if Y is judged to be a lot softer than X; and, lastly:
4. a grade of plus four is given to X if it is judged to be a whole lot softer than Y, and a grade of minus 4 is given if Y is judged to be a whole lot softer than X.

The grades are averaged and the resultant value is in units of PSU. The resulting data are considered the results of one panel test. If more than one sample pair is evaluated then all sample pairs are rank ordered according to their grades by paired statistical analysis. Then, the rank is shifted up or down in value as required to give a zero PSU value to which ever sample is chosen to be the zero-base standard. The other samples then have plus or minus values as determined by their relative grades with respect to the zero base standard. The number of panel tests performed and averaged is such that about 0.2 PSU represents a significant difference in subjectively perceived softness.

C. Measurement of Strength of Tissue Papers

Dry Tensile Strength:

The tensile strength is determined on one inch wide strips of sample using a Thwing-Albert Intelect II Standard Tensile Tester (Thwing-Albert Instrument Co., 10960 Dutton Rd., Philadelphia, Pa. 19154). This method is intended for use on finished paper products, reel samples, and unconverted stocks.

Sample Conditioning and Preparation:

Prior to tensile testing, the paper samples to be tested should be conditioned according to Tappi Method #T4020M-88. All plastic and paper board packaging materials must be carefully removed from the paper samples prior to testing. The paper samples should be conditioned for at least 2 hours at a relative humidity of 48 to 52% and within a temperature range of 22° to 24° C. Sample preparation and all aspects of the tensile testing should also take place within the confines of the constant temperature and humidity room.

For finished product, discard any damaged product. Next, remove 5 strips of four usable units (also termed sheets) and stack one on top to the other to form a long stack with the perforations between the sheets coincident. Identify sheets 1 and 3 for machine direction tensile measurements and sheets 2 and 4 for cross direction tensile measurements. Next, cut through the perforation line using a paper cutter (JDC-1-10 or JDC-1-12 with safety shield from Thwing-Albert Instrument Is Co., 10960 Dutton Road, Philadelphia, Pa. 19154) to make 4 separate stocks. Make sure stacks 1 and 3 are still identified for machine direction testing and stacks 2 and 4 are identified for cross direction testing.

Cut two 1" wide strips in the machine direction from stacks 1 and 3. Cut two 1" wide strips in the cross direction from stacks 2 and 4. There are now four 1" wide strips for machine direction tensile testing and four 1" wide strips for cross direction tensile testing. For these finished product samples, all eight 1" wide strips are five usable units (also termed sheets) thick.

For unconverted stock and/or reel samples, cut a 15" by 15" sample which is 8 plies thick from a region of interest of the sample using a paper cutter (JDC-1-10 or JDC-1-12 with safety shield from Thwing-Albert Instrument Co., 10960 Dutton Road, Philadelphia, Pa. 19154). Make sure one 15" cut runs parallel to the machine direction while the other runs parallel to the cross direction. Make sure the sample is conditioned for at least 2 hours at a relative humidity of 48 to 52% and within a temperature range of 22° to 24° C. Sample preparation and all aspects of the tensile testing should also take place within the confines of the constant temperature and humidity room.

From this preconditioned 15" by 15" sample which is 8 plies thick, cut four strips 1" by 7" with the long 7" dimension running parallel to the machine direction. Note these samples as machine direction reel or unconverted stock samples. Cut an additional four strips 1" by 7" with the long 7" dimension running parallel to the cross direction. Note these samples as cross direction reel or unconverted stock samples. Make sure all previous cuts are made using a paper cutter (JDC-1-10 or JDC-1-12 with safety shield from Thwing-Albert Instrument Co., 10960 Dutton Road, Philadelphia, Pa. 19154). There are now a total of eight samples: four 1" by 7" strips which are 8 plies thick with the 7" dimension running parallel to the machine direction and four 1" by 7" strips which are 8 plies thick with the 7" dimension running parallel to the cross direction.

Operation of Tensile Tester:

For the actual measurement of the tensile strength, use a Thwing-Albert Intelect II Standard Tensile Tester (Thwing-Albert Instrument Co., 10960 Dutton Rd., Philadelphia, Pa. 19154). Insert the flat face clamps into the unit and calibrate the tester according to the instructions given in the operation manual of the Thwing-Albert Intelect II. Set the instrument crosshead speed to 4.00 in/min and the 1st and 2nd gauge lengths to 2.00 inches. The break sensitivity should be set to 20.0 grams and the sample width should be set to 1.00" and the sample thickness at 0.025".

A load cell is selected such that the predicted tensile result for the sample to be tested lies between 25% and 75% of the range in use. For example, a 5000 gram load cell may be used for samples with a predicted tensile range of 1250 grams (25% of 5000 grams) and 3750 grams (75% of 5000 grams). The tensile tester can also be set up in the 10% range with the 5000 gram load cell such that samples with predicted tensiles of 125 grams to 375 grams could be tested.

Take one of the tensile strips and place one end of it in one clamp of the tensile tester. Place the other end of the paper strip in the other clamp. Make sure the long dimension of the strip is running parallel to the sides of the tensile tester. Also make sure the strips are not overhanging to the either side of the two clamps. In addition, the pressure of each of the clamps must be in full contact with the paper sample.

After inserting the paper test strip into the two clamps, the instrument tension can be monitored. If it shows a value of 5 grams or more, the sample is too taut. Conversely, if a period of 2–3 seconds passes after starting the test before any value is recorded, the tensile strip is too slack.

Start the tensile tester as described in the tensile tester instrument manual. The test is complete after the crosshead automatically returns to its initial starting position. Read and record the tensile load in units of grams from the instrument scale or the digital panel meter to the nearest unit.

If the reset condition is not performed automatically by the instrument, perform the necessary adjustment to set the instrument clamps to their initial starting positions. Insert the next paper strip into the two clamps as described above and obtain a tensile reading in units of grams. Obtain tensile readings from all the paper test strips. It should be noted that readings should be rejected if the strip slips or breaks in or at the edge of the clamps while performing the test.

Calculations:

For the four machine direction 1" wide finished product strips, sum the four individual recorded tensile readings. Divide this sum by the number of strips tested. This number should normally be four. Also divide the sum of recorded tensiles by the number of usable units per tensile strip. This is normally five for both 1-ply and 2-ply products.

Repeat this calculation for the cross direction finished product strips.

For the unconverted stock or reel samples cut in the machine direction, sum the four individual recorded tensile readings. Divide this sum by the number of strips tested. This number should normally be four. Also divide the sum of recorded tensiles by the number of usable units per tensile strip. This is normally eight.

Repeat this calculation for the cross direction unconverted or reel sample paper strips.

All results are in units of grams/inch.

EXAMPLES

The following examples are offered to illustrate the practice of the present invention. These examples are intended to aid in the description of the present invention, but, in no way, should be interpreted as limiting the scope thereof. The present invention is bounded only by the appended claims.

Example 1

This example illustrates the use of a direct roto-gravure printer to prepare a two-ply bath tissue having a strengthening agent on the interior surface of one ply.

Agents used in the preparation of the fluidized strengthening agent include Acrylic Latex (Rhoplex NW-2744F emulsion) of 45% solids from Rohm and Haas Company of Philadelphia, Pa.

The fluidized strengthening agent is prepared by mixing 50% acrylic latex with 50% tap water, resulting in a latex solids concentration of 23%. The fluidized strengthening agent is then fed to a gravure pan that allows the fluidized strengthening agent to fill the recessed areas of the rotating gravure roller.

The surface of the gravure roller is clad with an aluminum oxide ceramic into which the recessed areas are engraved by a laser technique. The recessed areas are hemispherically shaped, each having a diameter of about 55 microns and therefore a depth of about 28 microns. The pattern of the recessed areas is hexagonal and frequency of the recessed areas is about 350 areas per linear inch, such that there are about 140,000 recessed areas per square inch. The resultant percentage of total area covered by recessed areas is about 53%.

The excess fluidized strengthening agent is doctored from the surface of the gravure roller by a flexible PTFE doctor blade.

The direct printer is operated such that the surface speed of its rollers and therefore the tissue paper web speed is about 100 feet per minute.

The gravure roller is operated in contact with the tissue paper web, which is in contact with the impression roller. The impression roller has a rubber covering of about 50 P&J hardness, which is ½ inch thick with an outside diameter of 4 inches. The two rollers are loaded into interference such that the width of area of contact of the two rollers by virtue of the deformation of the rubber covering on the impression roller when the tissue paper web is not present is 5/32 of an inch.

A one-ply bath tissue paper web of about 10 mil thickness is passed through the nip formed between the gravure roller and the impression roller wherein which the fluidized strengthening agent transfers from the gravure roller to the tissue paper web. The tissue paper web that exits the nip formed by the gravure roller and impression roller contains about 3% strengthening agent (about 14% strengthening mixture) by weight.

The resultant one-ply tissue paper web is combined with another one-ply tissue paper web of the same type that has not been modified by the roto-gravure print process of the present invention. The resultant two-ply tissue web is converted into rolls of bath tissue.

The essential properties of the resultant tissue are measured and the following tables compare the strength and softness of Example 1 to Reference 1, a two-ply tissue product identical to Example 1, except that it does not incorporate the surface deposited strengthening agent of the present invention.

|  | Example 1: A two-ply tissue with Surface Deposited Strengthening Agent | Reference 1. A two-ply tissue without Surface Deposited Strengthening Agent |
| --- | --- | --- |
| Strengthening Agent | 1.5% | 0.0% |
| Caliper, mil | 16 | 15 |
| Tensile Strength (g/in) | 515 | 360 |
| Softness Score (psu) | −0.3 | 0.0 |

The resultant properties of Example 1 display an increase in strength with only a relatively minor decrease in softness compared to the Reference 1 product not incorporating the advantages of the present invention.

Example 2

This example illustrates the use of a direct rotogravure printer to prepare a two-ply bath tissue having a strengthening agent on the interior surfaces of two plies.

Agents used in the preparation of the fluidized strengthening agent include Acrylic Latex (Rhoplex NW-1845 emulsion) of 44% solids from Rohm and Haas Company of Philadelphia, Pa.

The fluidized strengthening agent is prepared by mixing 50% acrylic latex with 50% tap water, resulting in latex solids concentration of 22%. The fluidized strengthening agent is then fed to a gravure pan that allows the fluidized strengthening agent to fill the recessed areas of the rotating gravure roller.

The surface of the gravure roller is clad with an aluminum oxide ceramic into which the recessed areas are engraved by a laser technique. The recessed areas are hemispherically shaped, each having a diameter of about 55 microns and therefore a depth of about 28 microns. The pattern of the recessed areas is hexagonal and frequency of the recessed areas is about 350 areas per linear inch, such that there are about 140,000 recessed areas per square inch. The resultant percentage of total area covered by recessed areas is about 53%.

The excess fluidized strengthening agent is doctored from the surface of the gravure roller by a flexible PTFE doctor blade.

The direct printer is operated such that the surface speed of its rollers and therefore the tissue paper web speed is about 100 feet per minute.

The gravure roller is operated in contact with the tissue paper web, which is in contact with the impression roller. The impression roller has a rubber covering of about 50 P&J hardness, which is ½ inch thick with an outside diameter of 4 inches. The two rollers are loaded into interference such that the width of area of contact of the two rollers by virtue of the deformation of the rubber covering on the impression roller when the tissue paper web is not present is 5/32 of an inch.

A one-ply bath tissue paper web of about 10 mil thickness is passed through the nip formed between the gravure roller and the impression roller wherein which the fluidized strengthening agent transfers from the gravure roller to the tissue paper web. The tissue paper web that exits the nip formed by the gravure roller and impression roller contains about 4% strengthening agent (about 18% fluidized strengthening agent) by weight.

The resultant one-ply tissue paper web is combined with another one-ply tissue paper web of the same type that has also been modified in like manner by the rotogravure printing process of the present invention. The resultant two-ply tissue web is converted into rolls of bath tissue.

The essential properties of the resultant tissue are measured and the following tables compare the strength and softness of Example 2 to a two-ply tissue product identical to Example 2, except that it does not incorporate the surface deposited strengthening agent of the present invention. Example 2 is also compared to a two-ply tissue product identical to Example 2, except that it does not incorporate the surface deposited strengthening agent but rather it is strengthened by conventional means during papermaking via a combination of increased refining and wet end dry strength addition.

|  | Example 2: A Two-Ply Tissue with Surface Deposited Strengthening Agent | Reference 2. A Two-Ply Tissue without Surface Deposited Strengthening Agent | Reference 2A. A Two-Ply Tissue without Surface Deposited Strengthening Agent |
| --- | --- | --- | --- |
| Strengthening Agent | 4% | 0.0% | 0.0% |
| Caliper, mil | 16 | 16 | 20 |
| Tensile Strength (g/in) | 725 | 515 | 700 |

-continued

|  | Example 2: A Two-Ply Tissue with Surface Deposited Strengthening Agent | Reference 2. A Two-Ply Tissue without Surface Deposited Strengthening Agent | Reference 2A. A Two-Ply Tissue without Surface Deposited Strengthening Agent |
| --- | --- | --- | --- |
| Softness Score (psu) | −0.2 | 0 | −0.6 |

The resultant properties of Example 2 display an increase in strength with only a relatively minor decrease in softness compared to the Reference 2 product not incorporating the advantages of the present invention. The properties of Reference 2A illustrate that a product strengthened by conventional means during papermaking can be made nearly equal in strength to the Example 2 product, but the softness is significantly degraded by doing so.

What is claimed is:

1. A strong and soft multi-ply tissue paper product, said multi-ply tissue paper product comprising at least two plies in face to face relationship, wherein each of said plies has an interior surface oriented toward the interior of said multi-ply tissue paper product, wherein at least one of said interior surfaces of said plies has a surface deposited strengthening agent, said strengthening agent being deposited on said surface in a first relatively diffuse pattern essentially covering the entirety of said surface and in a second relatively uniform sparse pattern which is deposited on said surface at a frequency of between about 0.2 and about 2 deposits per inch, said second deposits having a diameter of at least 1000 microns wherein said strengthening agent comprises from about 0.5 to about 10% of said tissue paper product by weight based on the dry weight of said strengthening agent compared to the dry weight of said multiply tissue product.

2. The multi-ply tissue paper product of claim 1 wherein said strengthening agent is selected from a group consisting of starch, polyvinyl alcohol, polyamide resins, polyacrylamide resins, acrylic polymers, styrene-butadiene copolymers, vinyl acetate polymers, ethylene-vinyl acetate copolymers, vinyl chloride polymers, vinylidene chloride polymers, vinyl chloride-vinylidene copolymers, acrylonitrile copolymers, ethylene-acrylic copolymers and mixtures thereof.

3. The multi-ply tissue paper product of claim 2 wherein said strengthening agent comprises from about 2% to about 5% of said tissue paper product by weight based on the dry weight of said strengthening agent compared to the dry weight of said tissue paper product.

4. The multi-ply tissue paper product of claim 3 wherein said multi-ply tissue paper product has two plies.

5. The multi-ply tissue paper product of claim 4 wherein said plies comprise a wire side and a felt side wherein said felt side of both of said plies is oriented such that they comprise interior surfaces of said multi-ply tissue paper product.

6. The multi-ply tissue paper product of claim 5 wherein said strengthening agent comprises an elastomeric polymer with a glass transition temperature between about −30 degrees C. and about 10 degrees C.

7. The multi-ply tissue paper product of claim 6 wherein said elastomeric polymer is an acrylic polymer.

8. The multi-ply tissue paper product of claim 7 wherein said plies comprise through-air dried tissue paper webs.

9. The multi-ply tissue paper product of claim 8 wherein said acrylic polymer is distributed over essentially the entire surface of at least one of said interior surfaces of the tissue paper webs comprising said multi-ply tissue paper product.

10. A process for producing a soft, strong multi-ply tissue paper product, said process comprising the steps of a) applying by surface deposition a fluidized strengthening agent onto the surface of a tissue paper web thereby forming a surface strengthened tissue paper web comprising from about 0.5% to about 10% of said strengthening agent wherein said strengthening agent is applied to said surface in a first relatively diffuse pattern essentially covering the entirety of said surface and in a second relatively uniform sparse pattent which is deposited on said surface at a frequency of between about 0.2 and about 2 deposits per inch said second deposits having a diameter of at least 1000 microns ; and b) combining said surface strengthened tissue paper web of step (a) with at least one additional tissue paper web to form a multiply tissue paper product, orienting said surface strengthened tissue paper web being oriented such that the surface comprising the strengthening agent forms an interior surface of said multi-ply tissue paper product; wherein said multi-ply tissue paper product comprises tissue paper webs which remain unbonded over at least a majority of the surface of said webs.

11. The process of claim 10 wherein said fluidized strengthening agent is non-uniformly deposited such that a uniform sparse pattern of relatively concentrated areas of fluidized strengthening agent is deposited within a uniformly applied, relatively diffuse pattern of fluidized strengthening agent and wherein said combining step (b) is effected by applying a combining pressure sufficient to substantially join said surface strengthened tissue paper web to said additional tissue paper web by binding via the concentrated areas of strengthening agent said combining pressure being insufficient to effect binding by the areas of strengthening agent residing in the uniform relatively diffuse field.

12. The process of claim 11 wherein the process step comprising depositing said strengthening agent is effected by printing.

13. The process of claim 12 wherein said fluidized strengthening agent is a latex emulsion.

14. The process of claim 13 wherein said latex emulsion has a solids content between about 10% and about 50%.

15. The process of claim 14 wherein said latex emulsion comprises a polymer having a glass transition temperature between about −30 degrees C. and about 10 degrees C.

16. The process of claim 15 wherein said latex emulsion comprises an acrylic emulsion.

17. The process of claim 10 wherein said multi-ply tissue paper product is a two-ply tissue paper product.

18. The process of claim 17 wherein the process step comprising depositing said strengthening agent is effected by a printing step.

19. The process of claim 18 wherein said printing step is effected by use of a direct gravure process.

20. The process of claim 18 wherein said fluidized strengthening agent is a latex emulsion.

21. The process of claim 19 wherein said latex emulsion comprises a polymer having a glass transition temperature between about −30 degrees C. and about 10 degrees C.

22. The process of claim 20 wherein said latex emulsion comprises an acrylic emulsion.

23. The process of claim 21 wherein said latex emulsion is non-uniformly printed such that a uniform sparse pattern of relatively concentrated areas of latex is deposited within a uniformly applied, relatively diffuse pattern of latex emulsion and wherein said combining step (b) is effected by applying a combining pressure sufficient to substantially join said surface strengthened tissue paper web to said additional tissue paper web by binding via the concentrated areas of latex solids said combining pressure being insufficient to effect binding by the areas of latex solids residing in the uniform relatively diffuse field.

* * * * *

UNITED STATES PATENT AND TRADEMARK OFFICE
CERTIFICATE OF CORRECTION

PATENT NO.  :  5,851,352
DATED       :  December 22, 1998
INVENTOR(S) :  Kenneth Douglas Vinson et al.

It is certified that error appears in the above-identified patent and that said Letters Patent is hereby corrected as shown below:

Column 6, line 39, "multiply" should read -- multi-ply --.

Column 9, line 25, "multiply" should read -- multi-ply --.

Column 14, line 10, "Patant" should read -- Patent --.

Column 17, line 44, "multiply" should read -- multi-ply --.

Column 18, line 59, "inters," should read -- linters, --.

Column 21, line 51, "Patant" should read -- Patent --.

Column 24, line 9, delete "Is".

Column 26, line 59, "rotogravure" should read -- roto-gravure --.

Column 27, line 41, "rotogravure" should read -- roto-gravure --.

Column 28, line 27, "diffiuse" should read -- diffuse --.

Column 29, line 12, "inch" should read -- inch, --.

Column 29, line 13, "microns ;" should read -- microns; --.

Signed and Sealed this

Twenty-first Day of March, 2000

Attest:

Q. TODD DICKINSON

Attesting Officer

Commissioner of Patents and Trademarks